(12) United States Patent
Wu et al.

(10) Patent No.: US 11,246,182 B2
(45) Date of Patent: Feb. 8, 2022

(54) METHOD FOR HANDLING A RADIO RESOURCE CONTROL CELL GROUP CONFIGURATION

(71) Applicant: Google LLC, Mountain View, CA (US)

(72) Inventors: Chih-Hsiang Wu, Taoyuan (TW); Ching-Jung Hsieh, Taipei (TW)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 16/645,717

(22) PCT Filed: Oct. 3, 2019

(86) PCT No.: PCT/US2019/054530
§ 371 (c)(1),
(2) Date: Mar. 9, 2020

(87) PCT Pub. No.: WO2020/072793
PCT Pub. Date: Apr. 9, 2020

(65) Prior Publication Data
US 2020/0337108 A1      Oct. 22, 2020

Related U.S. Application Data

(60) Provisional application No. 62/741,239, filed on Oct. 4, 2018.

(51) Int. Cl.
*H04W 76/27*  (2018.01)
*H04W 76/32*  (2018.01)
(Continued)

(52) U.S. Cl.
CPC .......... *H04W 76/32* (2018.02); *H04B 7/0617* (2013.01); *H04L 5/0048* (2013.01);
(Continued)

(58) Field of Classification Search
None
See application file for complete search history.

(56) References Cited

U.S. PATENT DOCUMENTS

2013/0260810 A1   10/2013   Rayavarapu
2014/0293897 A1   10/2014   Kuo
(Continued)

OTHER PUBLICATIONS

"Condition for Reconfiguration with Sync at RRCSetup", 3GPP TSG-RAN WG2#104, Spokane, USA, Nov. 12-17, 2018, Nov. 2018, 4 pages.

(Continued)

*Primary Examiner* — Jamaal Henson
(74) *Attorney, Agent, or Firm* — Colby Nipper PLLC

(57) ABSTRACT

This document describes techniques and apparatuses for handling radio resource control (RRC) cell group configuration. In implementations, a base station (120) receives a first radio resource control message that requests a connection procedure between a user equipment (110) and the base station (e.g., 325, 425, 1325), such as a radio resource control resume request or a radio resource setup request. In response to receiving the first radio resource control message, the base station (120) generates a second radio resource control message that includes a cell-group-configuration information element that excludes a reconfiguration-with-sync information element (e.g., 330, 430, 1330). The base station (120) then transmits the second radio resource control message to the user equipment (110) (e.g., 335, 435, 1345). Afterward, the base station (120) receives, from the user equipment (110), a third radio resource control message that indicates the connection procedure is complete (e.g., 340, 440, 1350).

20 Claims, 20 Drawing Sheets

(51) Int. Cl.

| | |
|---|---|
| *H04W 8/08* | (2009.01) |
| *H04W 36/08* | (2009.01) |
| *H04W 48/20* | (2009.01) |
| *H04W 68/00* | (2009.01) |
| *H04B 7/06* | (2006.01) |
| *H04L 5/00* | (2006.01) |
| *H04W 72/04* | (2009.01) |
| *H04W 72/08* | (2009.01) |
| *H04W 74/08* | (2009.01) |
| *H04W 76/10* | (2018.01) |

(52) U.S. Cl.
CPC .............. *H04W 8/08* (2013.01); *H04W 36/08* (2013.01); *H04W 48/20* (2013.01); *H04W 68/005* (2013.01); *H04W 72/04* (2013.01); *H04W 72/046* (2013.01); *H04W 72/085* (2013.01); *H04W 74/0833* (2013.01); *H04W 76/10* (2018.02); *H04W 76/27* (2018.02)

(56) References Cited

U.S. PATENT DOCUMENTS

| | | | |
|---|---|---|---|
| 2016/0105917 A1 | | 4/2016 | Miao et al. |
| 2017/0005764 A1 | | 1/2017 | Park et al. |
| 2017/0290083 A1 | | 10/2017 | Tiwari |
| 2019/0141773 A1* | | 5/2019 | Kim ...................... H04W 76/19 |
| 2019/0215749 A1* | | 7/2019 | Shih ...................... H04W 36/30 |
| 2019/0215887 A1* | | 7/2019 | Burbidge .............. H04W 76/11 |
| 2020/0314700 A1* | | 10/2020 | Da Silva ........... H04W 36/0011 |
| 2020/0374961 A1 | | 11/2020 | Ingale |

OTHER PUBLICATIONS

"ETSI TS 138 331 V15.3.0", 5G; NR; Radio Resource Control (RRC); Protocol specification (3GPP TS 38.331 version 15.3.0 Release 15), Oct. 2018, 441 pages.

"ETSI TS 138 401 V15.3.0", 5G; NG-RAN; Architecture description (3GPP TS 38.401 version 15.3.0 Release 15), Sep. 2018, 41 pages.

"International Search Report and Written Opinion", PCT Application No. PCT/US2019/054530, dated Dec. 17, 2019, 13 pages.

"Introduction of RLF Report in SA", 3GPP TSG-RAN WG2 #103, Gothenburg, Sweden, Aug. 20-24, 2018, Aug. 2018, 20 pages.

"Notes", 3GPP TSG-RAN WG2 Meeting #103bis, Chengdu, China, Oct. 8-12, 2018, Oct. 2018, 9 pages.

"F1 Application Protocol (F1AP)", 3GPP TS 38.473 version 15.5.0 Release 15, May 2019, 200 pages.

"International Preliminary Report on Patentability", Application No. PCT/US2019/054530, dated Mar. 23, 2021, 7 pages.

* cited by examiner

2000 ⤴

```
┌─────────────────────────────────────────────┐
│  Transmit a first radio resource control    │
│  message to a base station to request a     │
│  connection procedure between a user        │
│  equipment and the base station             │
│                   2005                      │
└─────────────────────────────────────────────┘
                     │
                     ▼
┌─────────────────────────────────────────────┐
│  Receive a second radio resource control    │
│  message from the base station, the second  │
│  radio resource control message including   │
│  a cell-group-configuration information     │
│  element that excludes a reconfiguration-   │
│  with-sync information element              │
│                   2010                      │
└─────────────────────────────────────────────┘
                     │
                     ▼
┌─────────────────────────────────────────────┐
│  Perform the connection procedure with the  │
│  base station based, at least in part, on   │
│  the second radio resource control message  │
│  by transmitting, to the base station, a    │
│  third radio resource control message that  │
│  indicates the connection procedure is      │
│  complete                                   │
│                   2015                      │
└─────────────────────────────────────────────┘
```

*Fig. 20*

METHOD FOR HANDLING A RADIO RESOURCE CONTROL CELL GROUP CONFIGURATION

BACKGROUND

A Radio Resource Control (RRC) connection resume procedure is generally designed for a user equipment (UE) in an RRC_inactive state. A UE in the RRC_inactive state initiates the RRC connection resume procedure to transition to an RRC_connected state or for a periodic radio access network (RAN)-based Notification Area (RNA) update. A cell group configuration is generally configured by a base station and provided to a UE that is in the RRC_connected state. The cell group configuration includes at least one of a radio link control (RLC) bearer configuration, medium access control (MAC) configuration (e.g., MACCellGroupConfig), physical layer configuration (e.g., PhysicalCellGroupConfig), special cell configuration (e.g., SpCellConfig), or secondary cell configuration (e.g., SCellConfig) for the UE to communicate with one or more cells of the base station. A reconfiguration-with-sync information element (IE) (e.g., ReconfigurationWithSync) is configured by the base station in the cell group configuration. The reconfiguration-with-sync IE includes a serving cell configuration (e.g., ServingCellConfigCommon), a new UE identity (e.g., Radio Network Temporary Identifier (RNTI)-Value), and a timer value configuration (e.g., Timer T304). The reconfiguration-with-sync IE may or may not include a dedicated random access channel (RACH) configuration (e.g., RACH-ConfigDedicated).

In some RRC setup, resume, and reestablishment procedures, however, synchronization between the UE and the base station can be lost or interrupted, causing the procedure to fail. This behavior is inefficient and can cause delays in communications between the UE and the base station.

SUMMARY

This document describes techniques and apparatuses for handling a radio resource control (RRC) cell group configuration. These techniques include a base station determining to exclude a reconfiguration-with-sync information element (IE) (e.g., ReconfigurationWithSync) in a cell-group-configuration IE (e.g., CellGroupConfig) of an RRC message when the RRC message responds to an RRC request message from a user equipment (UE). These techniques alternatively include, during an RRC connection resume procedure or an RRC connection establishment procedure, the UE ignoring the reconfiguration-with-sync IE in the cell-group-configuration IE, determining the reconfiguration-with-sync IE as a reconfiguration failure, or initiating a random access procedure to establish a new RRC connection with the base station. These techniques prevent the reconfiguration-with-sync IE from triggering the UE to reset a medium access control (MAC) entity and cause an uplink synchronization failure.

In implementations, a base station receives a first radio resource control message that requests a connection procedure between a user equipment and the base station, such as a radio resource control resume request or a radio resource setup request. In response to receiving the first radio resource control message, the base station generates a second radio resource control message that includes a cell-group-configuration information element that excludes a reconfiguration-with-sync information element. The base station then transmits the second radio resource control message to the user equipment. Afterward, the base station receives, from the user equipment, a third radio resource control message that indicates the connection procedure is complete.

In implementations, a user equipment transmits a first radio resource control message to a base station to request a connection procedure between the user equipment and the base station. Afterward, the user equipment receives a second radio resource control message from the base station, where the second radio resource control message includes a cell-group-configuration information element that excludes a reconfiguration-with-sync information element. The user equipment then performs the connection procedure with the base station based, at least in part, on the second radio resource control message by transmitting, to the base station, a third radio resource control message that indicates the connection procedure is complete.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of handling a radio resource control (RRC) cell group configuration are described below. The use of the same reference numbers in different instances in the description and the figures indicate similar elements:

FIG. 20 depicts an example method for handling an RRC cell group configuration by a UE.

DETAILED DESCRIPTION

Overview

Figure 1:
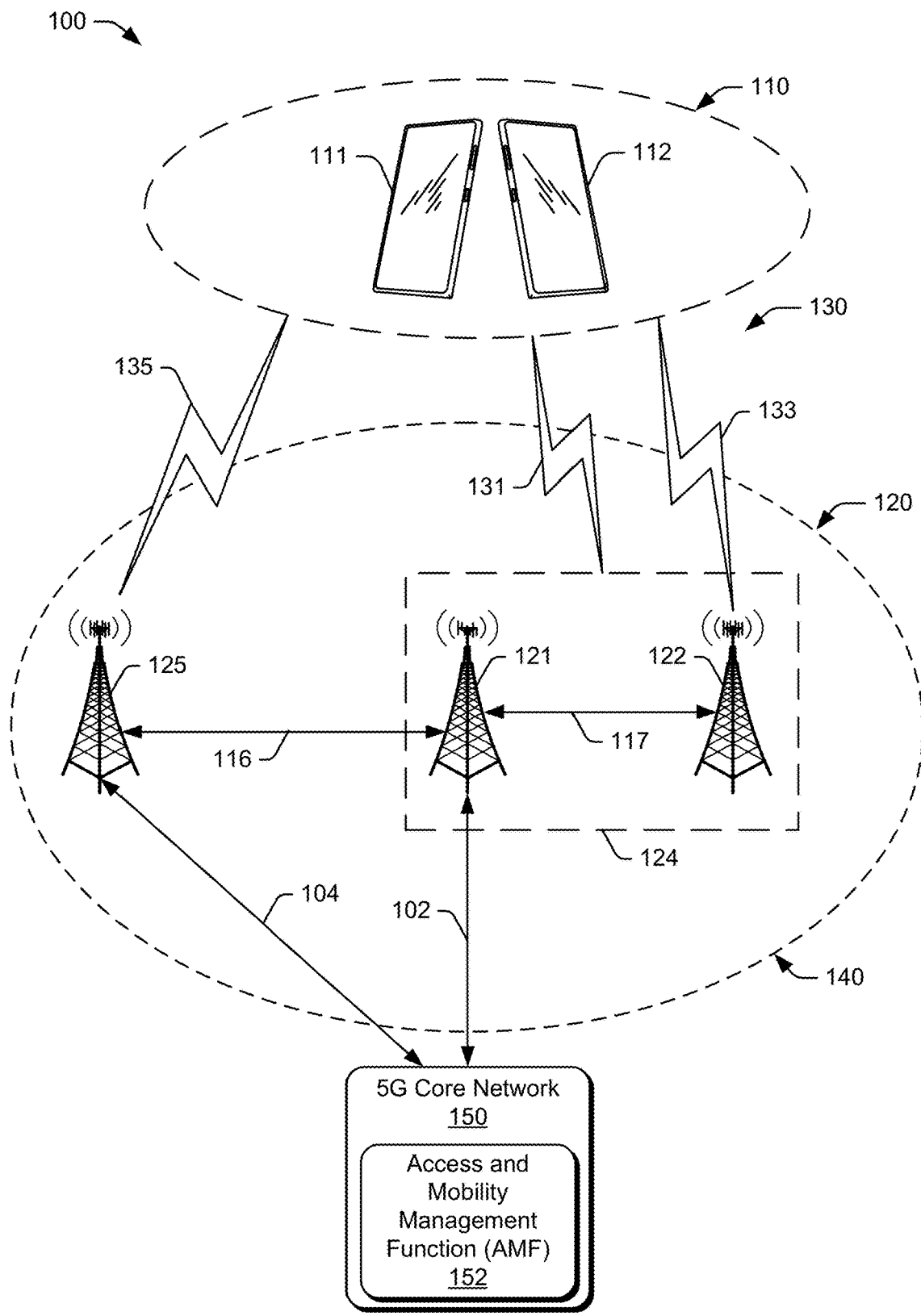
FIG. 1 illustrates an example operating environment in which aspects of handling an RRC cell group configuration can be implemented.

In conventional wireless communication systems, a base station automatically includes a reconfiguration-with-sync information element (IE) (e.g., ReconfigurationWithSync) in a radio resource control (RRC) message transmitted to a user equipment (UE). The reconfiguration-with-sync IE, however, triggers the UE to reset its media access control (MAC) entity, which causes the UE to treat a time alignment timer of any ongoing random access procedure as expired. Then, the UE uses the expired time alignment timer to determine that an uplink is not synchronized. Consequently, delays are introduced by this inefficient process because the uplink in actuality may still be synchronized when resuming or reestablishing an RRC connection, e.g., moving the UE from an RRC_inactive state or an RRC_idle state to an RRC_connected state.

This document describes techniques and apparatuses for handling a radio resource control cell group configuration, which avoids triggering the UE to reset its MAC entity and inadvertently determine the uplink as not synchronized. In implementations, a base station receives a first radio resource control message that requests a connection procedure between a user equipment and the base station, such as a radio resource control resume request or a radio resource setup request. In response to receiving the first radio resource control message, the base station generates a second radio resource control message that includes a cell-group-configuration information element that excludes a reconfiguration-with-sync information element. The base station then transmits the second radio resource control message to the user equipment. Afterward, the base station receives, from the user equipment, a third radio resource control message that indicates the connection procedure is complete. By determining to exclude the reconfiguration-with-sync information element from the cell-group-configuration information element based on the received (first) radio resource control message, the base station avoids transmitting the reconfiguration-with-sync IE to the UE and prevents the UE from resetting a corresponding MAC entity. This, in turn, prevents the UE from detecting a false indication of uplink synchronization failure and removes a source of delay during the connection procedures.

In implementations, a user equipment transmits a first radio resource control message to a base station to request a connection procedure between the user equipment and the base station. Afterward, the user equipment receives a second radio resource control message from the base station, where the second radio resource control message includes a cell-group-configuration information element that excludes a reconfiguration-with-sync information element. The user equipment then performs the connection procedure with the base station based, at least in part, on the second radio resource control message by transmitting, to the base station, a third radio resource control message that indicates the connection procedure is complete. In some implementations, the UE performs the connection procedure without resetting a corresponding MAC entity based on the second radio resource control message excluding the reconfiguration-with-sync information element. This avoids a (false) indication of uplink synchronization failure generated from resetting a time alignment timer (generated from resetting the MAC entity) and improves the connection procedure by reducing and/or eliminating delays.

Example Environments FIG. 1 illustrates an example wireless network environment 100 which includes a user equipment device 110 (UE 110) that communicates through one or more wireless communication links 130 (e.g., wireless links 131, 133, and 135) with a base station 120 that acts as a serving cell (serving base station 120).

Although illustrated as a smartphone, the user equipment 110 may be implemented as any suitable computing or electronic device, such as a mobile communication device, computing device, client device, a modem, cellular phone, mobile phone, entertainment device, gaming device, mobile gaming console, personal media device, navigation device, media device, laptop computer, desktop computer, tablet computer, smart appliance, vehicle-based communication system, charging device, Advanced Driver Assistance System (ADAS), point-of-sale (POS) transaction system, health monitoring device, drone, camera, wearable smart-device, mobile-internet device (MID), Internet of Things (IoT) device, Fifth Generation New Radio user equipment, and the like.

A macrocell, microcell, small cell, picocell, and the like, or any combination thereof may implement the base station 120 (e.g., an Evolved Universal Terrestrial Radio Access Network Node B, E-UTRAN Node B, evolved Node B, eNodeB, eNB, Next Generation eNB, ng-eNB, Next Generation Node B, gNode B, gNB, or the like) a base station transceiver system, a Wireless Local Access Network (WLAN) router, a satellite, a terrestrial television broadcast tower, an access point, a peer-to-peer device, another smart phone acting as a base station, and so forth. In some cases, the base station 120 is a Next Generation Node B base station (gNB). A gNB may include a gNB base station Central Unit (gNB-CU) and one or more gNB base stations Distributed Unit (gNB-DU). In some cases, the gNB-CU is a logical node hosting Radio Resource Control (RRC) and Packet Data Convergence Protocol (PDCP) protocols of the gNB or RRC and PDCP protocols of an en-gNB that controls the operation of one or more gNB-DUs. In some cases, the gNB-CU is a logical unit with no physical unit (e.g., baseband processing unit, radio frequency (RF) chain, antenna). In a typical implementation, a gNB-DU connects to only one gNB-CU. In some cases, the use of "gNB Distributed Unit" and "gNB-DU" refer to a logical node hosting the Radio Link Control (RLC), Medium Access Control (MAC), and the Physical (PHY) layers of the gNB or en-gNB. The gNB-CU at least partially controls the operation of the gNB-DU.

The base station 120 communicates with the UE 110 (e.g., UE 111, UE 112) via the wireless link 130 (e.g., wireless link 131, wireless link 133, wireless link 135). Any suitable type of wireless link may implement the wireless link 130. The wireless link 130 can include a downlink of data and control information communicated from the base station 120 to the UE 110, an uplink of other data and control information communicated from the UE 110 to the base station 120, or both. The wireless link 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth.

In aspects, the UE 110 communicates with a base station 124 via a wireless link 131. In this aspect, the base station 124 is a Next Generation Node B base station 124 (gNB 124). In FIG. 1, the gNB 124 includes gNB base station Central Unit 121 (gNB-CU 121) and gNB base station Distributed Unit 122 (gNB-DU 122). The gNB-CU 121 connects via a F1 interface 117 to gNB-DU 122. The use of "F1 interface" (F1) refers to a logical interface that connects a gNB-CU and a gNB-DU. The F1 interface specifications facilitate the inter-connection of the gNB-CU and the gNB-DU supplied by different manufacturers. The F1 interface, along with the NG interface and the Xn interface, are logical interfaces described by the technical specifications for New Radio and related specifications. The F1 Application Protocol (FLAP) supports the function of the F1 interface.

As illustrated in FIG. 1, the UE 110 may communicate with gNB-DU 122 via a wireless link 133. The wireless link 133 may be implemented using the same communication protocol or communication standard, or a different communication protocol or communication standard, as the wireless link 130.

As illustrated in FIG. 1, the UE 110 may communicate with gNB-CU 121 via the wireless link 133 to the gNB-DU 122 and the F1 interface 117. The F1AP interface provides a "container" for the gNB-CU 121 to send RRC messages to the UE, forwarded by the gNB-DU 122. The gNB-DU does not open the container to read or check the message inside. In other words, the gNB-CU 121 configures the UE context for both the gNB-DU 122 and the UE 110 individually, and then they communicate with each other according to the UE context.

In aspects, the UE 110 may communicate with another base station 125 (neighbor base station 125) via a wireless link 135. The wireless link 135 may be implemented using the same communication protocol or communication standard, or a different communication protocol or communication standard, as the wireless link 130. The neighbor base station 125 may be a gNB base station (gNB 125).

The gNB 124 (e.g., gNB-CU 121, gNB-DU 122), the gNB 125, and any additional base stations (not illustrated for clarity) are collectively a Radio Access Network 140 (RAN 140, Evolved Universal Terrestrial Radio Access Network 140, E-UTRAN 140, 5G NR RAN 140). RAN 140 connects via links (e.g., link 102, link 104) to a Fifth Generation Core network 150 (5GC 150) to form a wireless operator network.

The base stations 121 and 125 connect, at link 102 and link 104 respectively, to the 5GC 150 via an NG2 interface for control-plane signaling and via an NG3 interface for user-plane data communications. In addition to connections to core networks, base stations 120 may communicate with each other. For instance, the gNB 124 (e.g., base station 121) and the gNB 125 (e.g., neighbor base station 125) can communicate using an Xn Application Protocol (XnAP), at 116, to exchange user-plane and control-plane data. The 5GC 150 includes an Access and Mobility Management Function 152 (AMF 152) that provides control-plane functions such as registration and authentication of multiple UE devices 110, authorization, mobility management, or the like in the 5G NR network. The AMF 152 communicates with the base stations 120 in the RAN 140. The AMF 152 also communicates with multiple UE devices 110, via the base stations 120.

Example Devices

Figure 2:
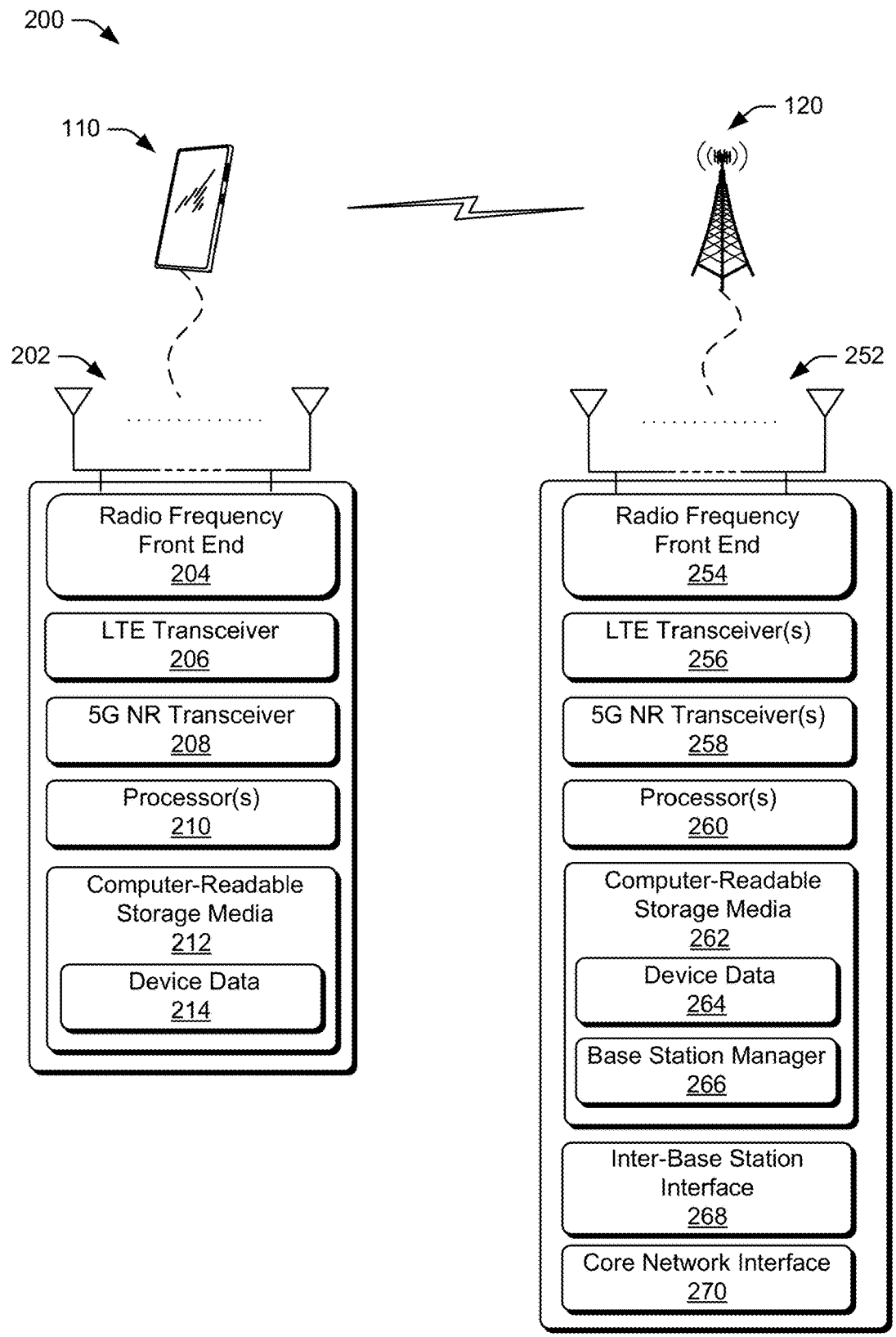
FIG. 2 illustrates example device diagrams of a user equipment and a base station that can be used to implement aspects of handling an RRC cell group configuration.

FIG. 2 illustrates an example device diagram 200 of the UE 110 and the base station 120. The UE 110 and the base station 120 may include additional functions and interfaces omitted from FIG. 2 for the sake of clarity. The UE 110 includes antennas 202, a radio frequency front end 204 (RF front end 204), a wireless transceiver, such as an LTE transceiver 206, and/or a 5G NR transceiver 208, for communicating with one or more base stations 120 in the 5G RAN 140. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented as any suitable type of wireless transceiver (e.g., the LTE transceiver 206, and/or the 5G NR transceiver 208). Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single-core processor or a multiple-core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more wireless transceivers, such as one or more LTE transceivers 256, and/or one or more 5G NR transceivers 258, for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by radio frequency transceivers, such as the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn, an X2, and/or a F1 interface, which the base station manager 266 configures to exchange user-plane and control-plane data between another base station 120 and to manage the communication of the base stations 120 with the UE 110. The F1 interface is a logical interface that connects a gNB-CU and a gNB-DU. The base stations 120 include a core network interface 270 that the base station manager 266 configures to exchange user-plane and control-plane data with core network functions and entities.

Figure 3:
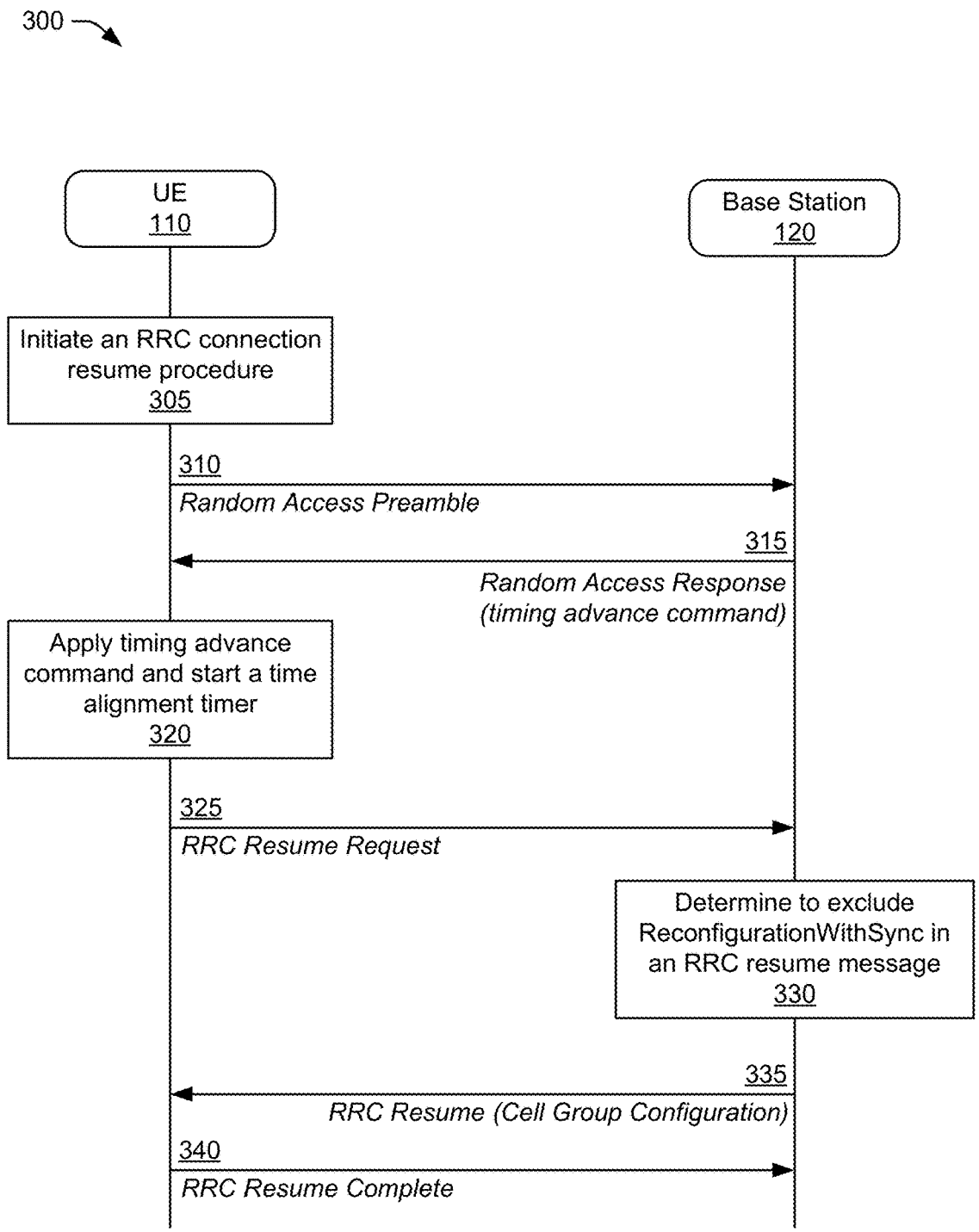
FIG. 3 illustrates an example signaling and control transaction diagram that is in accordance with one or more implementations of handling an RRC cell group configuration.
Figure 4:
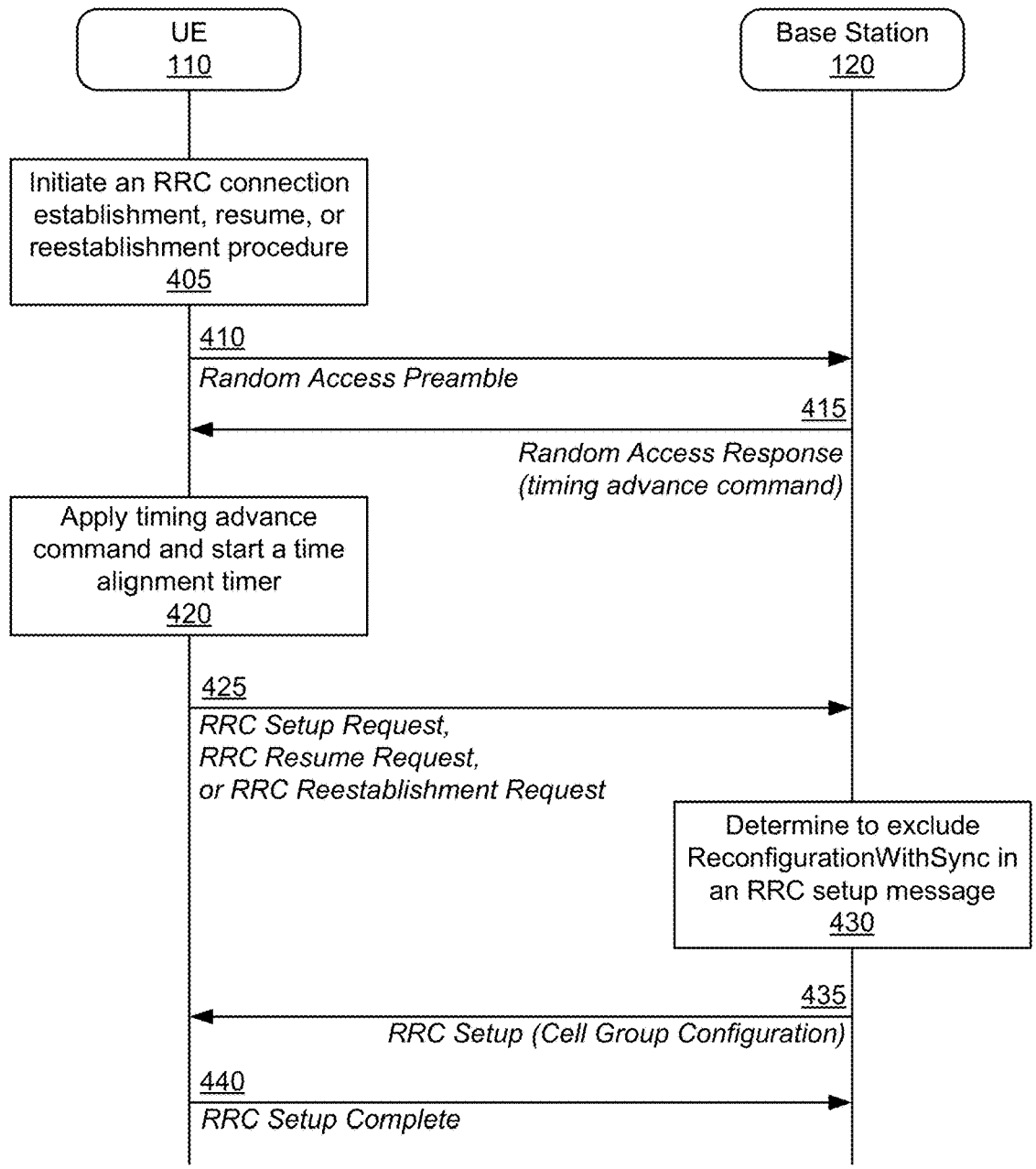
FIG. 4 illustrates an example signaling and control transaction diagram that is in accordance with one or more implementations of handling an RRC cell group configuration.
Figure 5:
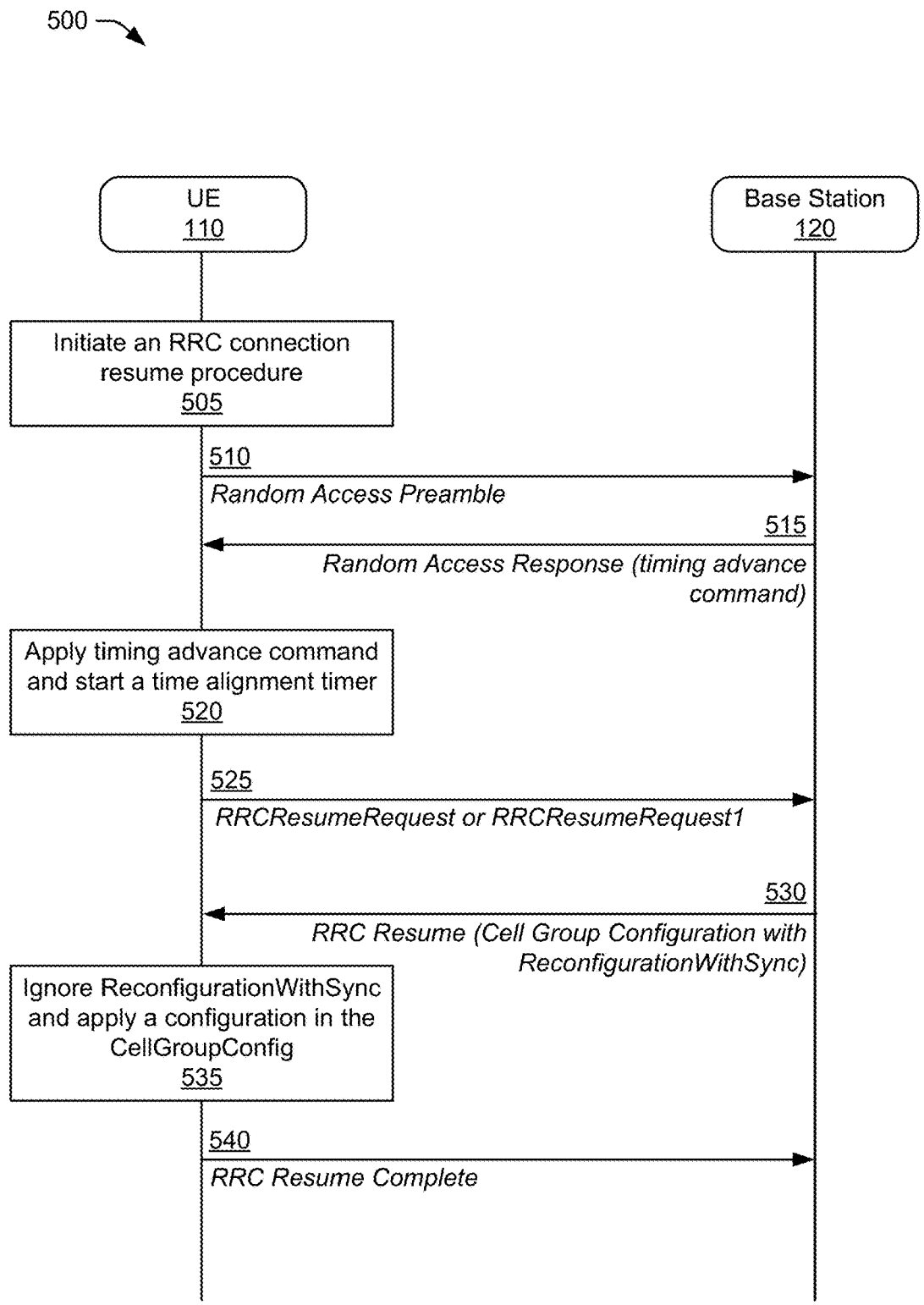
FIG. 5 illustrates an example signaling and control transaction diagram that is in accordance with one or more implementations of handling an RRC cell group configuration.
Figure 6:
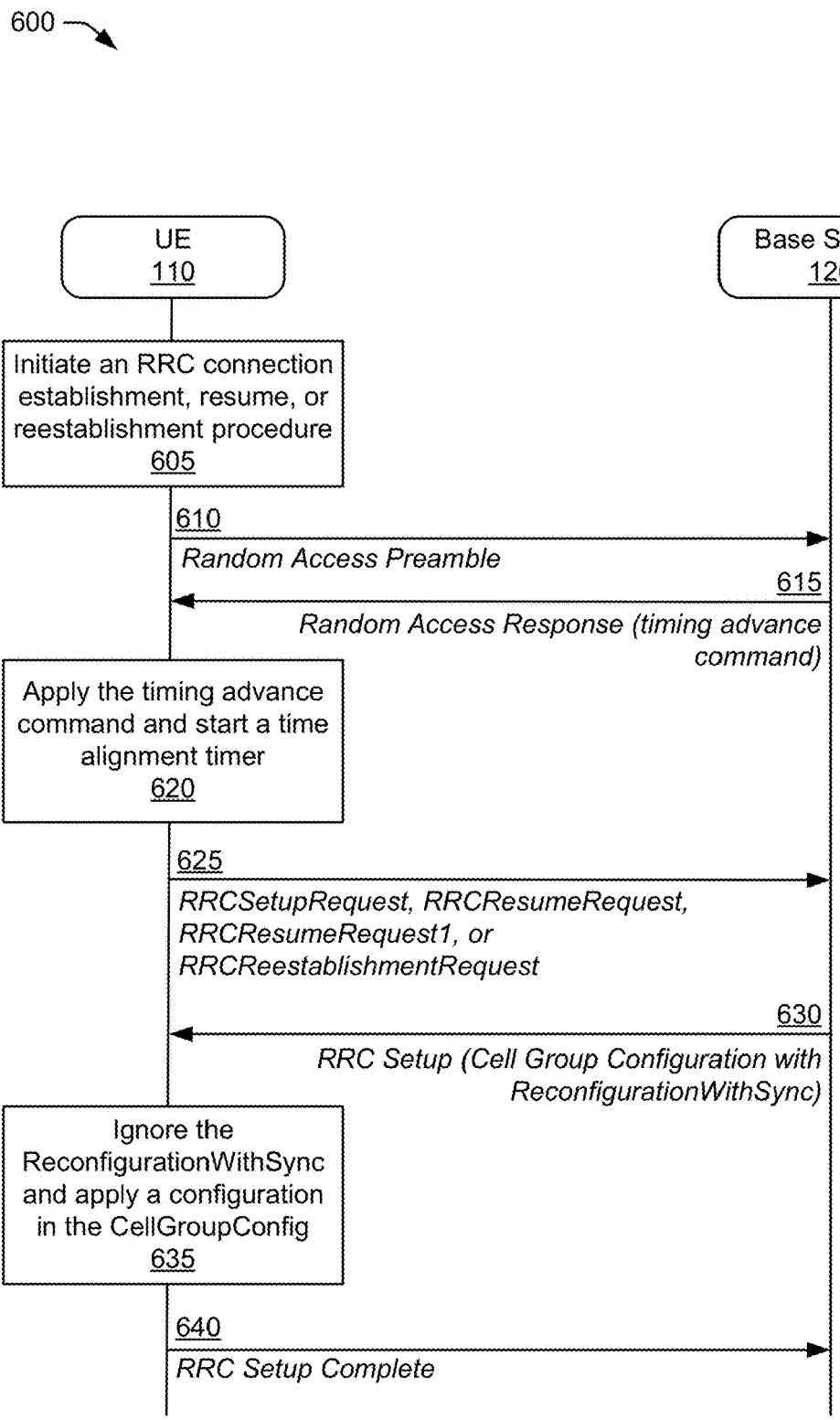
FIG. 6 illustrates an example signaling and control transaction diagram that is in accordance with one or more implementations of handling an RRC cell group configuration.
Figure 7:
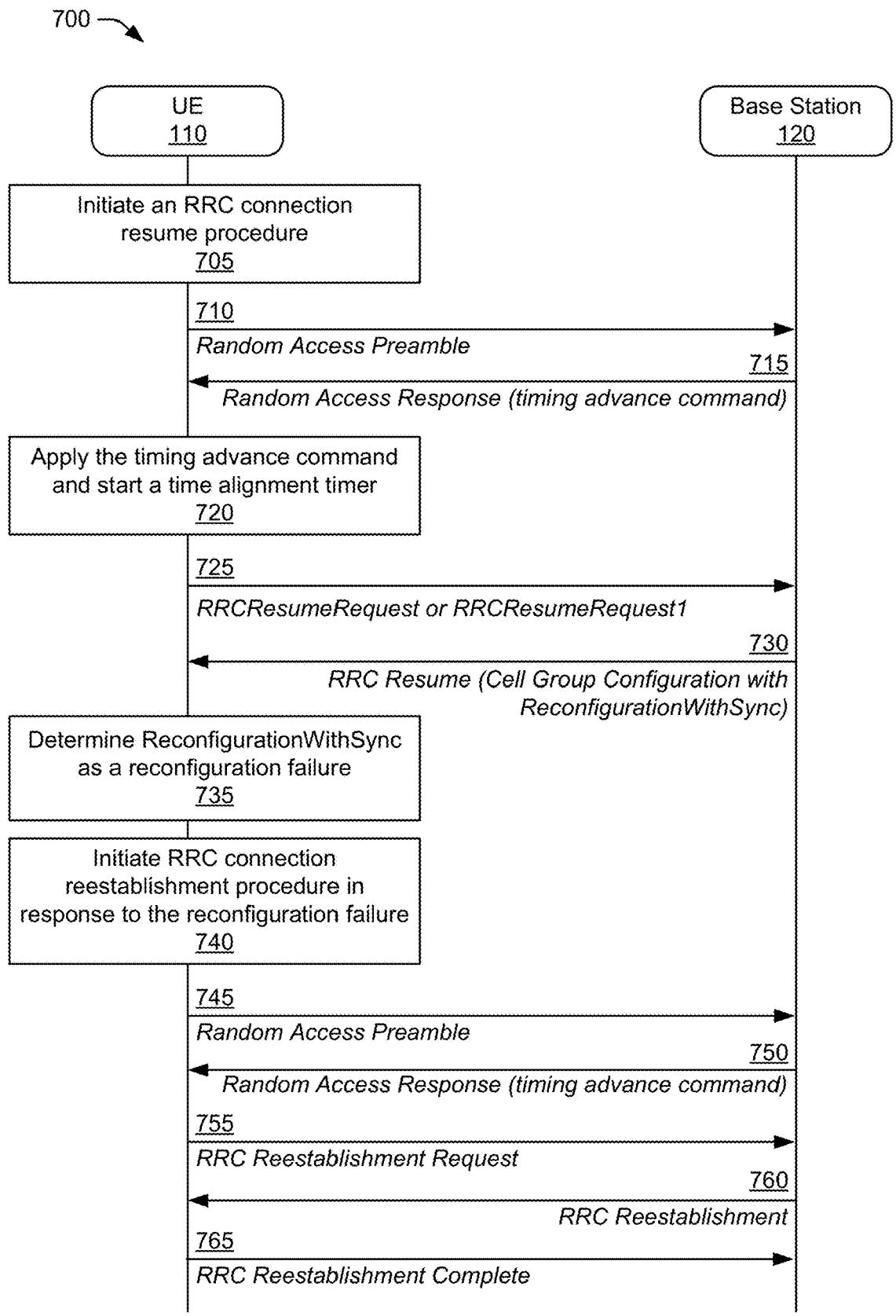
FIG. 7 illustrates an example signaling and control transaction diagram that is in accordance with one or more implementations of handling an RRC cell group configuration.
Figure 8:
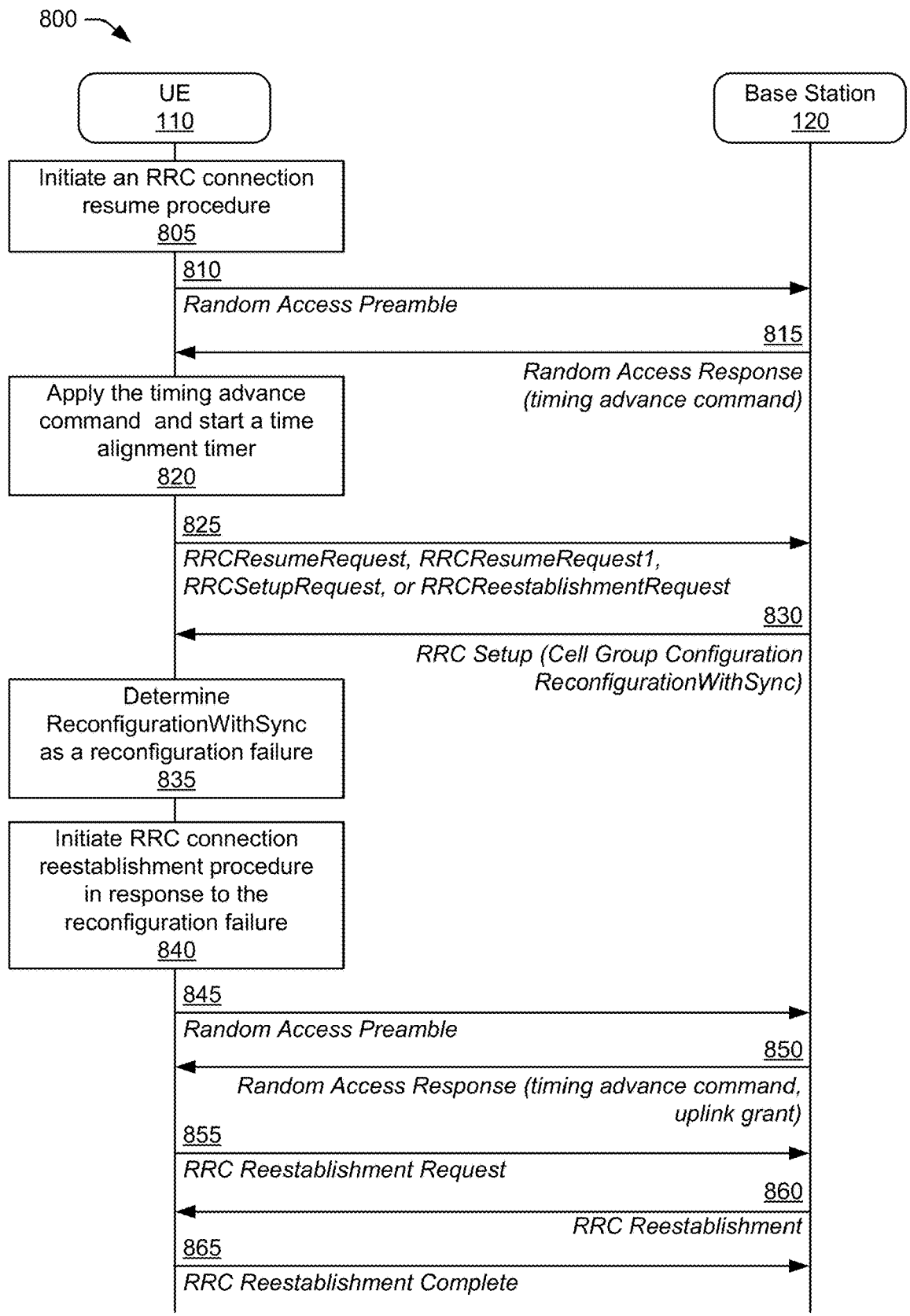
FIG. 8 illustrates an example signaling and control transaction diagram that is in accordance with one or more implementations of handling an RRC cell group configuration.
Figure 9:
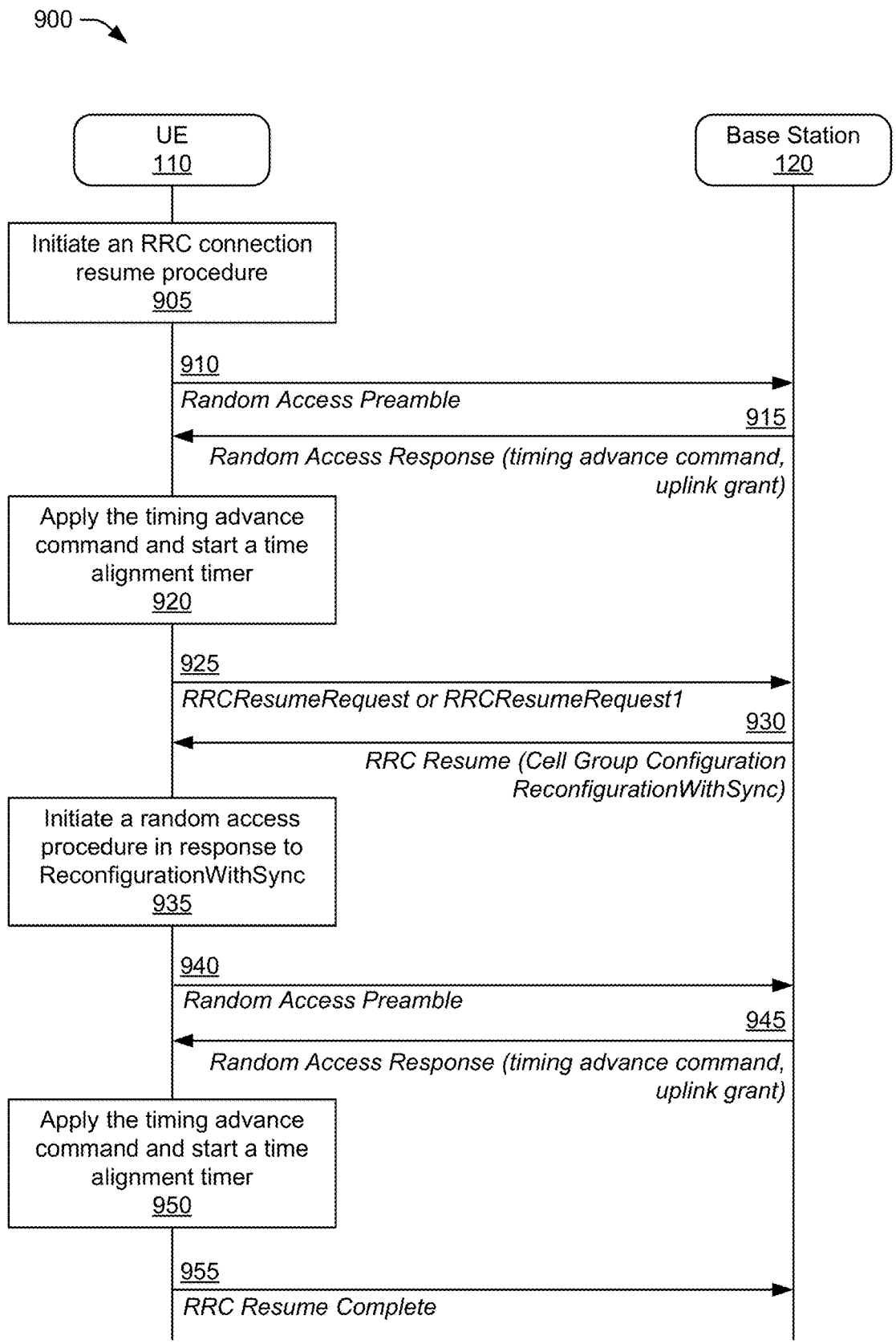
FIG. 9 illustrates an example signaling and control transaction diagram that is in accordance with one or more implementations of handling an RRC cell group configuration.
Figure 10:
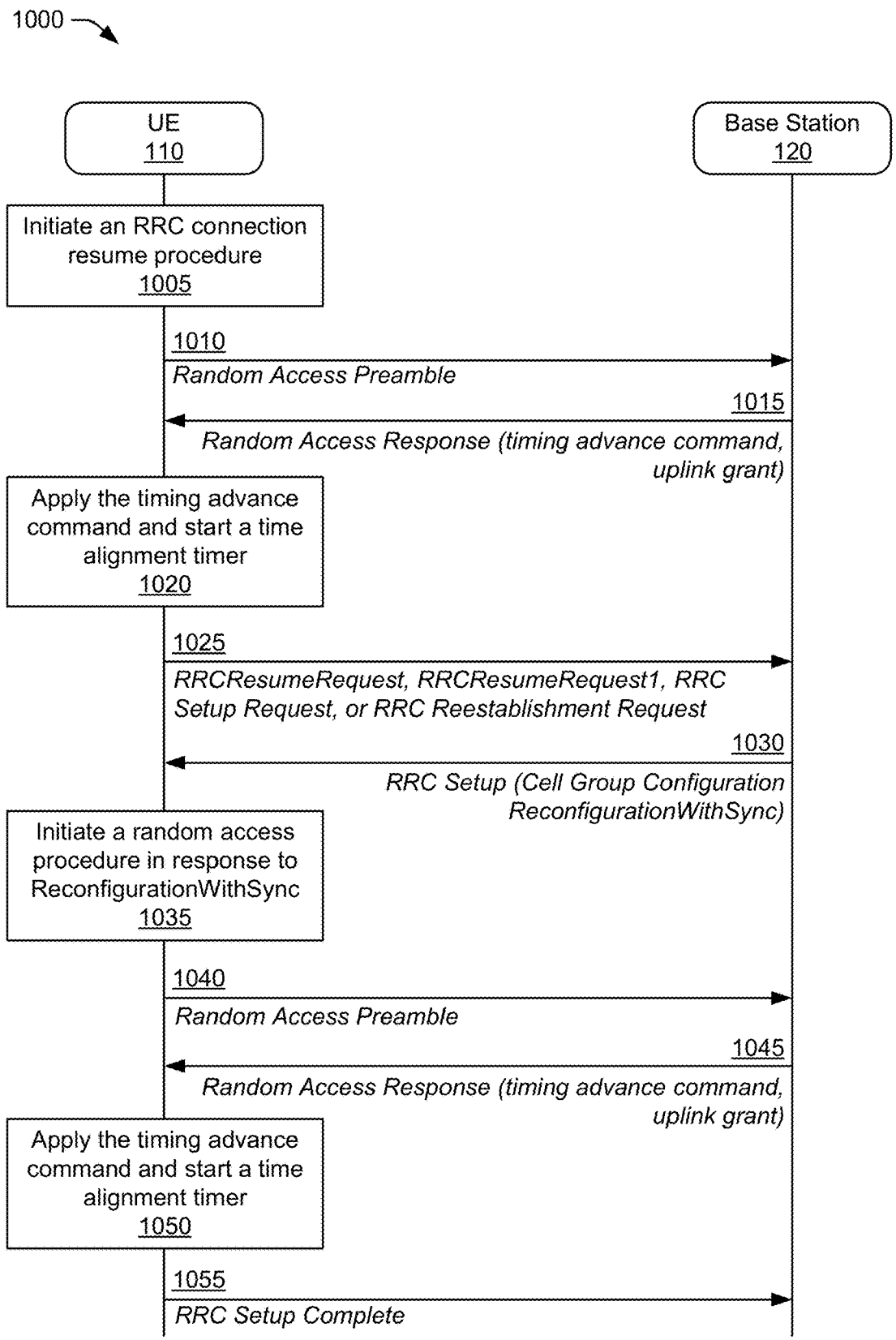
FIG. 10 illustrates an example signaling and control transaction diagram that is in accordance with one or more implementations of handling an RRC cell group configuration.
Figure 11:
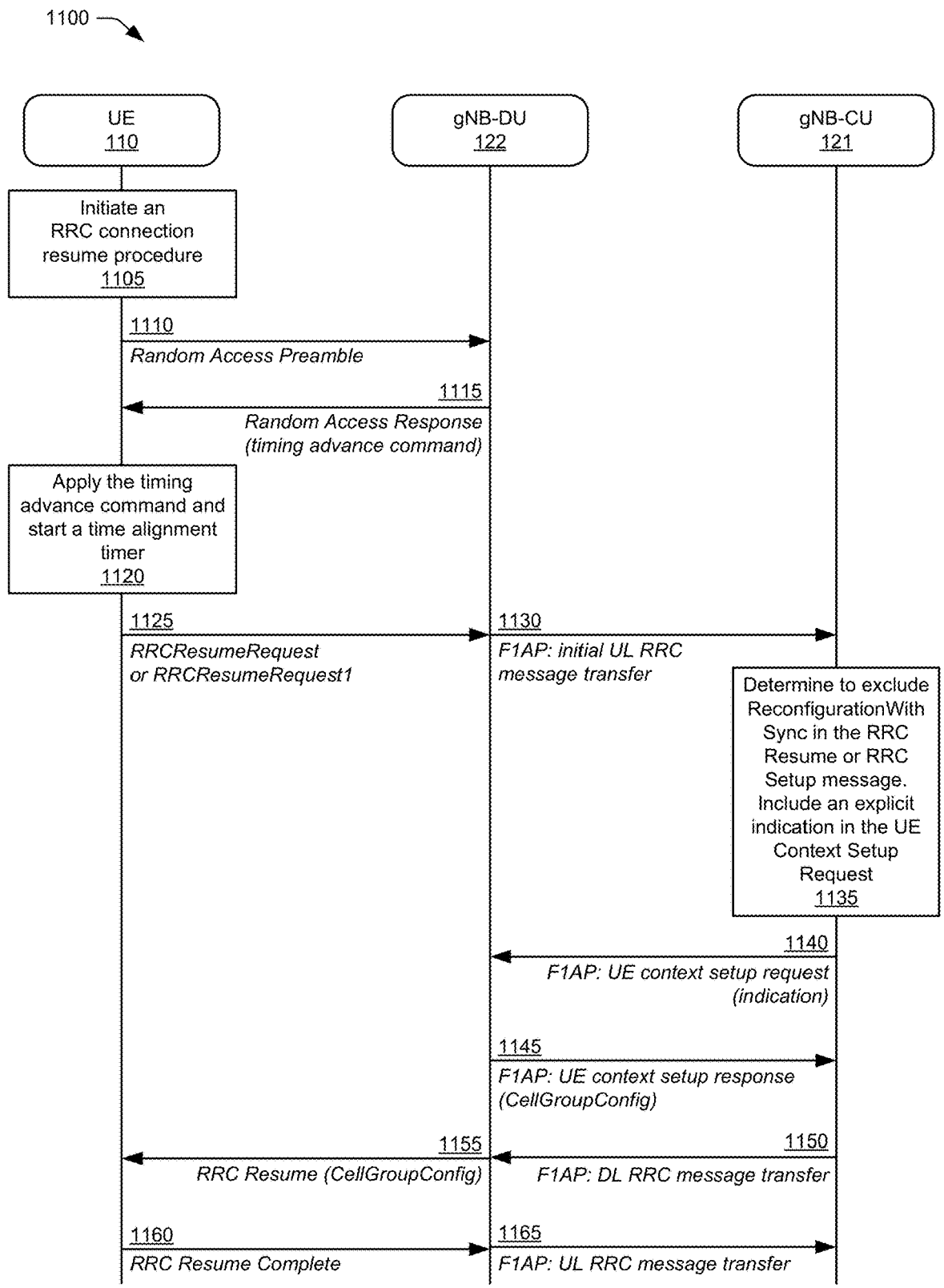
FIG. 11 illustrates an example signaling and control transaction diagram that is in accordance with one or more implementations of handling an RRC cell group configuration.
Figure 12:
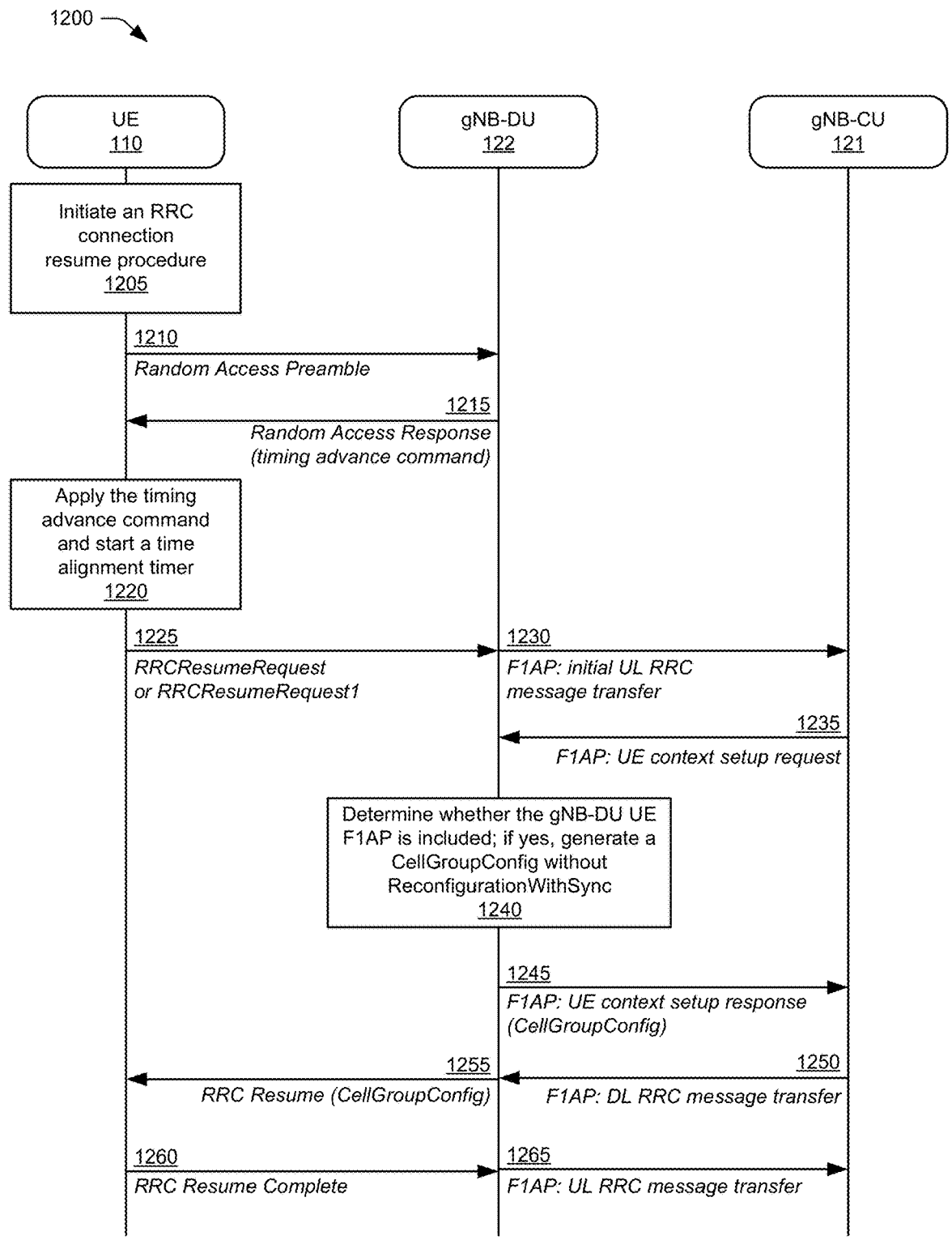
FIG. 12 illustrates an example signaling and control transaction diagram that is in accordance with one or more implementations of handling an RRC cell group configuration.
Figure 13:
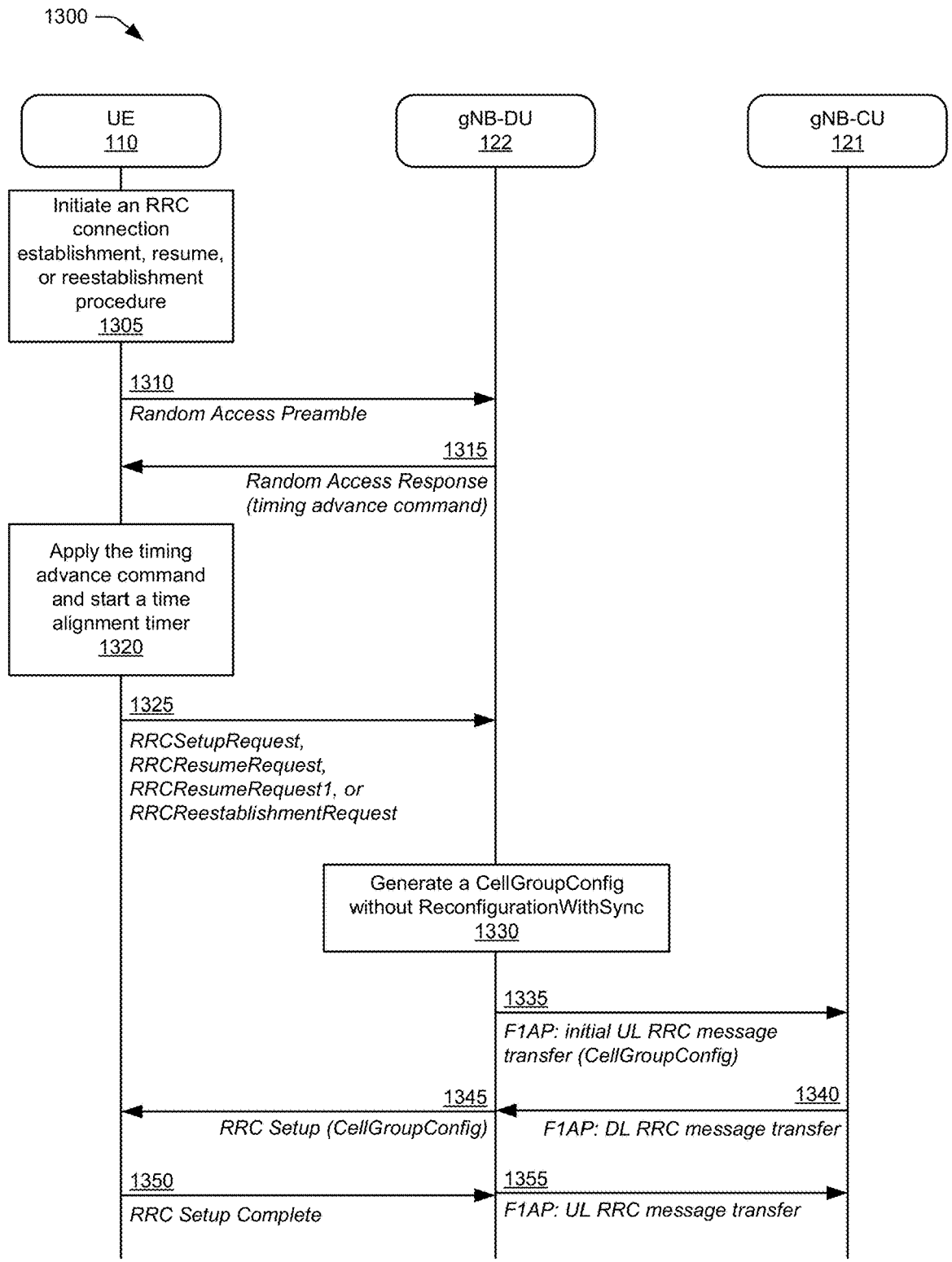
FIG. 13 illustrates an example signaling and control transaction diagram that is in accordance with one or more implementations of handling an RRC cell group configuration.

FIGS. 3-13 illustrate various example signaling and control transaction diagrams for handling RRC cell group configurations during an RRC connection resume procedure or an RRC connection establishment procedure. In FIGS. 3 and 4, a base station determines to exclude a reconfiguration-with-sync information element (IE) in a cell-group-configuration IE of an RRC message when the RRC message responds to an RRC request message from a user equipment (UE). If the UE receives the reconfiguration-with-sync IE in a cell-group-configuration IE, FIGS. 5 and 6 depict the UE ignoring the reconfiguration-with-sync IE in the cell-group-configuration IE when appropriate. If the UE receives the reconfiguration-with-sync IE in the cell-group-configuration IE, FIGS. 7 and 8 illustrate the UE determining that the reconfiguration-with-sync IE properly forms the basis for a reconfiguration failure. In FIGS. 9 and 10, the UE initiates a random access procedure to establish a new RRC connection with the base station. FIGS. 11-13 illustrate a disaggregated base station architecture in which different components of the disaggregated base station determine whether to exclude the reconfiguration-with-sync IE in the RRC message to the UE.

FIG. 3 illustrates an example signaling and control transaction diagram 300 that is in accordance with one or more implementations of handling an RRC cell group configuration. In implementations, the diagram 300 describes example transactions associated with an RRC connection resume procedure which can be used to resume a previous RRC connection when a UE is in an RRC_inactive state. FIG. 4 depicts an example RRC procedure for establishing, resuming, or reestablishing an RRC connection for a UE in an RRC_idle state, an RRC_inactive state, or an RRC_connected state, respectively.

The signaling and control transaction diagram 300 illustrates aspects of a base station handling a radio resource control (RRC) cell group configuration for an RRC connection resume procedure. As illustrated at 305, a UE 110 initiates an RRC connection resume procedure to resume a previous RRC_connected state with the base station 120 (e.g., gNB). In some implementations, the UE initiates the RRC connection resume procedure while operating in an RRC_inactive state. As part of the initiating the RRC connection resume procedure and/or in response to initiating the RRC connection resume procedure, the UE 110 transmits, at 310, a random access preamble to the base station 120. At 315, the base station 120 responds with a random access response (RAR) that includes a timing advance command. At 320, the UE 110 then applies the timing advance command to synchronize an uplink and starts a time alignment timer (e.g., TimeAlignmentTimer) in response to the RAR. Then, at 325, the UE transmits an RRC request message (e.g., RRCResumeRequest or RRCResumeRequest1) to the base station 120.

At 330, the base station 120 determines to exclude a reconfiguration-with-sync information element (IE) (e.g., ReconfigWithSync) in a cell-group-configuration IE (e.g., CellGroupConfig) of an RRC Resume message for the UE 110. Generally, this reconfiguration-with-sync information element (IE) causes the UE 110 to reset a Medium Access Control (MAC) entity, which results in the UE 110 considering the time alignment timer to be expired. Because the UE 110 also uses the status of the time alignment timer to determine whether the uplink is synchronized with the base station 120, consequently, the expired timer status causes the UE 110 to fail to transmit an RRC Resume Complete message (e.g., RRCResumeComplete). In conventional systems operating under current 3GPP communication standards, the base station is required to include the reconfiguration-with-sync IE in the RRC Resume message.

In contrast to the conventional systems that require the base station 120 to include the reconfiguration-with-sync IE in the RRC Resume message, the base station 120 using the described techniques determines to not include the reconfiguration-with-sync IE in the cell-group-configuration IE. Rather, the base station 120 generates the cell-group-configuration IE without the reconfiguration-with-sync IE and includes the cell-group-configuration IE in the RRC resume message. At 335, the base station 120 transmits the RRC resume message, with the cell-group-configuration IE, to the UE 110 in response to the RRC resume request message. Because the reconfiguration-with-sync IE is not included in the RRC resume message, the UE 110 is not triggered to reset the MAC entity, the time alignment timer remains non-expired, and the uplink remains synchronized. In other words, the UE maintains a state of the MAC entity, rather than resetting the MAC entity. At 340, the UE 110 then transmits an RRC resume complete message to the base station 120 in response to the RRC resume message 314 to indicate that the RRC connection resume procedure is complete.

FIG. 4 illustrates an example signaling and control transaction diagram 400 that is in accordance with one or more implementations of handling an RRC cell group configuration. As illustrated, at 405, the UE 110 initiates an RRC procedure to establish, resume, or reestablish an RRC connection. Initiating the RRC procedure can include initiating an RRC connection establishment procedure, an RRC connection resume procedure, or an RRC connection reestablishment procedure. In implementations, the UE 110 initiates the RRC connection establishment procedure when operating in an RRC_idle state, initiates the RRC connection resume procedure when operating in an RRC_inactive state, and/or initiates the RRC connection reestablishment procedure when operating in an RRC_connected state.

As part of the initiating and/or in response to the initiating, the UE 110 transmits a random access preamble to the base station 120 at 410. At 415 and in response to receiving the random access preamble, base station 120 transmits a random access response including the timing advance command to the UE 110. In response to receiving the random access response, the UE 110 applies the timing advance command to synchronize the uplink and starts the time alignment timer at 420.

At 425, the UE 110 then transmits an RRC request message (e.g., an RRC resume request message, an RRC setup request message, or an RRC reestablishment request message) to the base station 120. When the base station 120 receives one of the RRC resume request message, the RRC setup request message, or the RRC reestablishment request message, the base station 120 determines to exclude the reconfiguration-with-sync IE in a cell-group-configuration IE for the UE 110 at 430. The base station 120 generates an RRC setup message with the cell-group-configuration IE (without the reconfiguration-with-sync IE) and transmits the RRC setup message to the UE 110 at 435. At 440 and in response to receiving the RRC setup message, the UE 110 transmits an RRC setup complete message to the base station 120 to complete the one of the RRC connection establishment procedure, the RRC connection resume procedure, or the RRC connection reestablishment procedure.

Using these techniques prevents transmitting a reconfiguration-with-sync IE to the UE that causes the UE to reset the MAC entity, treat the time alignment timer as expired, and determine that the uplink is not synchronized. In other words, the UE maintains a state of the MAC entity, rather than resetting the MAC entity, and avoids resetting the time alignment timer. This avoids a synchronization failure of the uplink, which is problematic in conventional systems.

In some instances, however, the base station may still transmit the reconfiguration-with-sync IE in the RRC message to the UE. In such cases, the UE implements functionality to avoid uplink synchronization failure. To illustrate, consider FIGS. 5 and 6 that depict the UE ignoring the reconfiguration-with-sync IE in the cell-group-configuration IE. FIG. 5 illustrates a signaling and control transaction diagram 500 that, in some cases, depicts example transactions corresponding to an RRC connection resume procedure used to resume a previous RRC connection for a UE operating in an RRC_inactive state. FIG. 6 illustrates a signaling and control transaction diagram 600 that describes example transactions used in an RRC procedure for establishing, resuming, or reestablishing an RRC connection for a UE operating in one of: an RRC_idle state, an RRC_inactive state, or an RRC_connected state, respectively.

Diagram 500 of FIG. 5 illustrates a UE handling an RRC cell group configuration for an RRC connection resume procedure. As illustrated at 505, the UE 110, when operating in the RRC_inactive state, initiates an RRC connection resume procedure to resume a previous RRC_connected state with the base station 120 (e.g., gNB). As part of initiating the RRC connection resume procedure and/or in response to initiating the RRC connection resume procedure, the UE 110 transmits, at 510, a Random Access Preamble to the base station 120. At 515, the base station 120 responds with a Random Access Response (RAR) that includes a timing advance command Afterward, at 520, the UE 110 applies the timing advance command to synchronize the uplink and starts a time alignment timer (e.g., TimeAlignmentTimer) in response to the RAR. Then, at 525, the UE 110 transmits an RRC Resume Request message (e.g., RRCResumeRequest or RRCResumeRequest1) to the base station 120.

At 530, the base station 120 transmits an RRC resume message that includes a cell-group-configuration IE for a master cell group (MCG), where the cell group configuration includes the reconfiguration-with-sync IE. In this case, at 535, the UE 110 ignores the reconfiguration-with-sync IE in the cell-group-configuration IE. The UE 110 can apply the configuration in the cell-group-configuration IE while ignoring the reconfiguration-with-sync IE. Subsequently, at 540, the UE 110 transmits the RRC resume complete message to the base station. In this way, failure of the uplink synchronization is avoided because the UE 110 is not triggered to reset its MAC entity by the reconfiguration-with-sync IE.

Diagram 600 of FIG. 6 illustrates a UE handling an RRC cell group configuration for an RRC procedure. As illustrated at 605, the UE 110 initiates one of an RRC connection establishment procedure, an RRC connection resume procedure, or an RRC connection reestablishment procedure. At 610, the UE 110 transmits a random access preamble to the base station 120, and the base station 120 responds with a random access response at 615, where the random access response includes the timing advance command Responsively, the UE 110 applies the timing advance command to get the uplink synchronized and starts the time alignment timer at 620.

Next, at 625 the UE 110 transmits a request message (e.g., RRCSetupRequest, RRCResumeRequest, RRCResumeRequest1, or RRCReestablishmentRequest) to the base station 120 to establish, resume, or reestablish the RRC connection. At 630 and in response to receiving the request message, the base station 120 transmits an RRC setup message that includes the cell-group-configuration IE. If the cell-group-configuration IE includes the reconfiguration-with-sync IE, the UE 110 ignores the reconfiguration-with-sync IE and applies a configuration in the cell-group-configuration IE at 635. Then, at 640, the UE 110 transmits an RRC setup complete message (RRCSetupComplete) to the base station 120 based on the RRC setup message to complete the one of the RRC connection establishment procedure, the RRC connection resume procedure, or the RRC connection reestablishment procedure.

As an alternative to the techniques described with respect to FIGS. 3 and 4, the UE may perform different functions in response to receiving the reconfiguration-with-sync IE from the base station. For example, FIGS. 7 and 8 illustrate example signaling and control transaction diagrams that correspond to the UE determining that the reconfiguration-with-sync IE properly forms the basis for a reconfiguration failure. FIG. 7 includes a signaling and control transaction diagram 700 that describes an example implementation in which the UE requests to resume a previous RRC connection while operating in RRC_inactive state. FIG. 8 includes a signaling and control transaction diagram 800 in which a UE requests to establish, resume, or reestablish an RRC connection while operating in an RRC_idle state, an RRC_inactive state, or an RRC_connected state, respectively.

The diagram 700 of FIG. 7 illustrates example transactions between a UE and a base station that use an RRC cell group configuration for an RRC connection resume procedure. At 705, the UE 110 initiates an RRC connection resume procedure. As part of the initiating and/or in response to the initiating, the UE 110 transmits, at 710, a random access preamble to the base station 120. At 715 and in response to receiving the random access preamble, the base station 120 transmits a random access response with a timing advance command to the UE 110. The UE 110 applies, at 720, the timing advance command to synchronize the uplink and starts the time alignment timer in response to the random access response. At 725, the UE 110 transmits an RRC request message (e.g., RRCResumeRequest or RRCResumeRequest1) to the base station 120, and at 730 the base station returns an RRC resume message that includes the cell-group-configuration IE for a cell group (e.g., a master cell group (MCG), a secondary cell group (SCG)) and the reconfiguration-with-sync IE.

At 735, rather than interpreting the reconfiguration-with-sync IE as a trigger to reset the MAC entity and treat the time alignment timer as expired as in conventional techniques, the UE 110 instead determines that the reconfiguration-with-sync IE in the RRC resume message indicates a reconfiguration failure. In response, as illustrated at 740, the UE 110 initiates an RRC connection reestablishment procedure to recover the reconfiguration failure, rather than sending an RRC resume complete message. In implementations, the UE 110 initiates the RRC connection reestablishment procedure by transmitting, at 745, a random access preamble to the base station 120. At 750, the base station 120 transmits a random access response 720 with the timing advance command to the UE 110. The UE 110 then transmits an RRC reestablishment request message to the base station 120 at 755. In response, at 760, the base station 120 transmits an RRC reestablishment message to the UE 110, and the UE 110 sends an RRC reestablishment complete message to the base station 120 at 765 to indicate that the RRC connection reestablishment procedure is complete.

The diagram 800 of FIG. 800 illustrates example transactions between a UE and base station that correspond to utilizing an RRC cell group configuration for an RRC procedure. Similar to discussions above, at 805, the UE 110 initiates one of an RRC connection establishment procedure, an RRC connection resume procedure, or an RRC connection reestablishment procedure. In response to the initiating and/or as part of the initiating, the UE 110 transmits a random access preamble to the base station 120 at 810. In response to receiving the random access preamble, the base station 120 transmits, to the UE 110, a random access response that includes a timing advance command at 815.

The UE 110 applies the timing advance command to synchronize the uplink and starts the time alignment timer in response to the random access response at 820. Afterward, at 825, the UE 110 transmits an RRC request message (e.g., RRCResumeRequest, RRCResumeRequest1, RRCSetupRequest, or RRCReestablishmentRe quest) to the base station 120 to request an RRC connection to be resumed, established, or reestablished.

At 830, the base station returns an RRC setup message that includes the cell-group-configuration IE for the cell group and the reconfiguration-with-sync IE. At times, the base station 120 returns the RRC setup message, such as in scenarios where the base station 120 does not have an RRC configuration that was used during a previous RRC_connected state of the UE 110.

At 835, the UE 110 determines that the reconfiguration-with-sync IE in the cell-group-configuration IE is a reconfiguration failure. Based on this failure determination, at 840, the UE 110 initiates an RRC connection reestablishment procedure. As part of initiating the RRC connection reestablishment procedure and/or in response to initiating the RRC connection reestablishment procedure, the UE 110 sends a random access preamble to the base station at 845. At 850, the base station 120 sends the UE 110 a random access response (RAR). In response to receiving the RAR, the UE transmits an RRC reestablishment request at 855 to the base station 120 instead of an RRC setup complete message, in response to the RRC setup message to recover the reconfiguration failure. At 860, the base station 120 then transmits an RRC reestablishment message and, in response, the UE 110 transmits an RRC reestablishment complete message at 865 to indicate that the RRC connection reestablishment procedure is complete.

Rather than determining a reconfiguration failure, as described with respect to FIGS. 7 and 8, FIGS. 9 and 10 illustrate example signaling and control transaction diagrams in which the UE initiates a random access procedure to establish a new RRC connection with the base station, such as in response to receiving the reconfiguration-with-sync IE from the base station. FIG. 9 illustrates signaling and control transaction diagram 900 that depicts a UE requesting to resume a previous RRC connection while operating in an RRC_inactive state. FIG. 10 illustrates signaling and control transaction diagram 1000 that depicts a UE requesting to establish, resume, or reestablish an RRC connection with a base station while operating in an RRC_idle state, an RRC_inactive state, or an RRC_connected state.

Diagram 900 of FIG. 9 illustrates the UE 110 handling a radio resource control cell group configuration for an RRC connection resume procedure. As above, at 905, the UE 110 initiates an RRC connection resume procedure. In response to the initiating and/or as part of the initiating, the UE 110 transmits, at 910, a random access preamble to the base station 120. In response to receiving the random access preamble, the base station 120 transmits a random access response to the UE 110 at 915, where the random access response includes a timing advance command and indicates one or more uplink (communication) resources provided by an uplink grant.

At 920, and after receiving the random access response, the UE 110 applies the timing advance command to synchronize the uplink and starts the time alignment timer. The UE 110 then transmits an RRC request message (e.g., RRCResumeRequest or RRCResumeRequest1) to the base station 120 at 925. In reply, the base station 120 returns an RRC resume message at 930, where the RRC resume message includes a cell-group-configuration IE for a cell group and a reconfiguration-with-sync IE.

At 935 and in response to the reconfiguration-with-sync IE in the cell-group-configuration, the UE 110 initiates a new random access procedure. In response to the initiating and/or as part of the initiating, the UE 110 transmits a random access preamble to the base station 120 at 940.

At 945, the UE 110 receives a random access response from the base station 120 where, in implementations, the base station 120 transmits the random access response based on receiving the random access preamble transmitted at 940. The UE 110 applies the timing advance command at 950 to synchronize the uplink and starts a new time alignment timer. The UE 110 then transmits an RRC resume complete message to the base station 120 at 955, where the UE transmits the RRC resume complete message using one or more of the uplink resources indicated by the uplink grant transmitted/received in the random access response described at 945.

In one example, the UE performs the new random access procedure according to random access configuration(s) in the reconfiguration-with-sync IE or in the RRC resume message. Alternatively, the UE performs the new random access procedure according to random access configuration(s) in one or more system information blocks(s) broadcast by the base station 120.

Diagram 1000 of FIG. 10 depicts the UE 110 handling a radio resource control cell group configuration for an RRC procedure. Similar to discussions above, at 1005, the UE 110 initiates one of an RRC connection establishment procedure, an RRC connection resume procedure, or an RRC connection reestablishment procedure. In response to the initiating and/or as part of the initiating, the UE transmits a random access preamble to the base station 120 at 1010.

In response to receiving the random access preamble, the base station 120 transmits a random access response to the UE 110 at 1015, where the random access response includes a timing advance command. At 1020, the UE 110 applies the timing advance command to synchronize the uplink and starts the time alignment timer in response to the random access response. Afterward, the UE 110 transmits, at 1025, an RRC request message (e.g., RRCResumeRequest, RRCResumeRequest1, RRCSetupRequest, or RRCReestablishmentRequest) to the base station 120 to request that an RRC connection be established. The base station then returns an RRC setup message at 1030, where the RCC setup message includes a cell-group-configuration IE for a cell group and a reconfiguration-with-sync IE.

At 1035, the UE 110 initiates a new random access procedure in response to the reconfiguration-with-sync IE in the cell-group-configuration IE. In response to the initiating and/or as part of the initiating, the UE transmits a random access preamble to the base station 120 at 1040.

The base station 120 responds to the random access preamble by transmitting a Random Access Response at 1045. In some implementations, the Random Access Response transmitted at 1045 includes a timing advance command and/or indicates one or more uplink (communication) resources provided by an uplink grant. Then, at 1050, the UE 110 applies 1020 the timing advance command to synchronize the uplink and starts a new time alignment timer. Further, at 1055, the UE 110 transmits an RRC setup complete message to the base station 120 on uplink resources configured by the uplink grant transmitted at 1045.

In one example, the UE 110 performs the new random access procedure according to random access configuration(s) in the reconfiguration-with-sync IE or in the RRC resume message. Alternatively, the UE 110 performs the new random access procedure according to random access configuration(s) in one or more system information blocks(s) broadcast by the base station 120.

FIGS. 11-13 illustrate example signaling and control transaction diagrams in which different components of a disaggregated base station determine whether to exclude the reconfiguration-with-sync IE in the RRC message to the UE. During an RRC connection resume procedure, a gNB-CU in FIG. 11 determines whether to exclude the reconfiguration-with-sync IE from an RRC message to the UE during an RRC connection resume procedure. Alternatively, in FIG. 12, a gNB-DU makes this determination. FIG. 13, however, illustrates the gNB-DU making this determination during a procedure for establishing, resuming, or reestablishing an RRC connection for a UE in an RRC_idle state, an RRC_inactive state, or an RRC_connected state, respectively.

FIG. 11 illustrates a signaling and control transaction diagram 1100 that depicts example transactions of an RRC resume procedure in a disaggregated base station architecture. As shown in FIG. 11, a disaggregated base station (e.g., gNB) architecture consists of a gNB-CU (gNB-CU 121) connected to one or more gNB-DUs (gNB-DU 122) using an F1 interface. Here, the UE 110 connects to the gNB-CU 121 using a gNB-DU 122 of the one or more gNB-DUs.

At 1105, the UE 110 initiates an RRC connection resume procedure. In response to the initiating and/or as part of the initiating, the UE 110 transmits a Random Access Preamble to the gNB-DU 122 at 1110. The gNB-DU 122 then responds with a random access response at 1115, where the random access includes a timing advance command. At 1120, the UE 110 applies the timing advance command to synchronize the uplink and starts a time alignment timer. Then, at 1125, UE 110 transmits an RRC request message (e.g., RRCResumeRequest or RRCResumeRequest1) to the gNB-DU 122.

In some, implementations, the gNB-CU 121 receives the RRC request message from the UE 110 via the gNB-DU 122. For example, at 1130, the gNB-DU 122 communicates the RRC request message to the gNB-CU 121 using an F1AP Initial UL RRC Message Transfer message that includes a UE-identifier (e.g., gNB-DU UE F1AP ID) allocated by the gNB-DU 122. To avoid triggering the UE 110 to reset the MAC entity and causing an uplink synchronization failure, the gNB-CU 121 determines, at 1135, to exclude the reconfiguration-with-sync IE in the RRC resume message or the RRC setup message. The gNB-CU 121 then generates a UE-context-setup-request message with an explicit indication to the gNB-DU 122 to generate the cell-group-configuration IE without the reconfiguration-with-sync IE. At 1140, the gNB-CU 121 transmits a F1AP UE-context-setup-request with the explicit indication to the gNB-DU 122.

In some implementations, the gNB-CU 121 includes an indication in the UE-context-setup-request message and sets the indication to one of two values. A first value of the two values directs the gNB-DU 122 to generate the cell-group-configuration IE without the reconfiguration-with-sync IE. A second value of the two values directs the gNB-DU 122 to generate the reconfiguration-with-sync IE in the cell-group-configuration IE.

In some implementations, and in response to the indication being set to the first value, the gNB-DU 122 generates the cell-group-configuration IE without the reconfiguration-with-sync IE and sends a UE context setup response message that includes the cell-group-configuration IE to the gNB-CU 121 at 1145. Based on the UE-context-setup-request message including the indication, the gNB-DU 122, at times, generates the cell-group-configuration IE without the reconfiguration-with-sync IE. Alternately or additionally, based on the UE-context-setup-request message excluding the indication, some implementations of the gNB-DU 122 generate cell-group-configuration IE with the reconfiguration-with-sync IE.

In some implementations, the indication directs the gNB-DU 122 to generate the reconfiguration-with-sync IE in the cell-group-configuration IE. Based on the UE-context-setup-request message excluding the indication, the gNB-DU 122, at times, generates the cell-group-configuration IE without the reconfiguration-with-sync IE.

In response to receiving the UE-context-setup-request message message transmitted at 1145, the gNB-CU 121 transmits an RRC resume message to the gNB-DU 122 using an F1AP DL RRC message transfer at 1150. In turn, at 1155, the gNB-DU 122 forwards the RRC resume message to the UE 110. Thus, in response to the RRC request message transmitted by the UE 110 at 1125, the gNB-CU 121 transmits an RRC resume message that includes the cell-group-configuration IE to the UE 110 using the gNB-DU 122.

At 1160, the UE 110 transmits an RRC resume complete message to the gNB-DU 122. In turn, at 1165, the gNB-DU 122 sends the RRC resume complete message to the gNB-CU 121 using an F1AP UL RRC message transfer, where the RRC resume complete message indicates completion of the RRC connection resume procedure. Accordingly, the transactions as described in diagram 1100 prevent the UE 110 from triggering a reset to a corresponding MAC entity, thus avoiding a synchronization failure in the uplink.

FIG. 12 illustrates signaling and control transaction diagram 1200 of an RRC resume procedure in a disaggregated base station architecture. At 1205, the UE 110 initiates an RRC connection resume procedure to transition from an RRC_inactive state to an RRC_connected state. In response to the initiating and/or as part of the initiating, the UE 110 transmits a Random Access Preamble to the gNB-DU 122 at 1210. At 1215, the gNB-DU 122 responds with a random access response that includes a timing advance command. The UE 110 applies the timing advance command at 1220 to synchronize the uplink. In some implementations, the UE 110 also starts a time alignment timer at 1220. Afterward, the UE 110 transmits an RRC request message (e.g., RRCResumeRequest or RRCResumeRequest1) to the gNB-DU 122 at 1225.

At 1230, and in response to receiving the RRC request message, the gNB-DU 122 communicates the RRC resume request message to the gNB-CU 121 using an F1AP initial UL RRC message transfer. In other words, the gNB-CU 121 receives the RRC request message from the UE 110 in the initial UL RRC message transfer message from the gNB-DU 122. In implementations, the initial UL RRC message transfer message includes a UE-identifier (e.g., gNB-DU UE F1AP ID) allocated by the gNB-DU 122.

At 1235, the gNB-CU 121 communicates, using F1AP messaging, a UE-context-setup-request message to the gNB-DU 122, where the UE-context-setup-request message includes the UE-identifier from the initial UL RRC message transfer message received at 1230. The gNB-DU 122 then determines, at 1240, whether the UE-context-setup-request message 1214 includes the UE-identifier.

In response to determining that the UE-context-setup-request message includes the UE-identifier, the gNB-DU 122 generates a cell-group-configuration IE without the reconfiguration-with-sync IE. Alternately or additionally, in response to determining that the UE-context-setup-request message excludes the UE-identifier, the gNB-DU 122 generates the cell-group-configuration IE with the reconfiguration-with-sync IE. At 1245, the gNB-DU 122 communicates the cell-group-configuration IE in a UE-context-setup-response message to the gNB-CU 121. This scenario may be applicable for a mobility case when the UE 110 moves from one gNB-DU to another gNB-DU.

In response to receiving the UE context setup response message with the cell-group-configuration IE that excludes the reconfiguration-with-sync IE, the gNB-CU 121 encodes and transmits an RRC resume message to the UE 110 based on exchanges with the gNB-DU 122. To illustrate, the gNB-CU 121 communicates an F1AP message (e.g., F1AP DL RRC message transfer) to the gNB-DU 122 at 1250. In turn, the gNB-DU 122 transmits the RRC resume message, including the cell-group-configuration IE, to the UE 110 at 1255. Alternately or additionally, in response to receiving the UE context setup response message with the cell-group-configuration IE that includes the reconfiguration-with-sync IE, the gNB-DU 122 transmits an RRC reconfiguration message to the UE 110 (not illustrated).

In response to receiving the RRC resume message transmitted at 1255, the UE 110 transmits an RRC resume complete message to the gNB-DU 122 at 1260. In turn, the gNB-DU transmits the RRC resume message to the gNB-CU 121 using the F1AP UL RRC message transfer at 1265. Using these techniques, the UE 110 is not triggered to reset its MAC entity and synchronization failure is avoided. Accordingly, the transactions as described in diagram 1200 prevent the UE 110 from triggering a reset to a corresponding MAC entity, thus avoiding a synchronization failure in the uplink.

FIG. 13 illustrates signaling and control transaction diagram 1300 that depicts example transactions used for establishing, resuming, or reestablishing an RRC connection in a disaggregated base station architecture. At 1305, the UE 110 initiates one of an RRC connection establishment procedure, an RRC connection resume procedure, or an RRC connection reestablishment procedure. In response to the initiating and/or as part of the initiating, the UE 110 transmits a random access preamble to the gNB-DU 122 at 1310. In response to receiving the random access preamble, the gNB-DU 122 transmits with a random access response at 1315, where the random access response includes a timing advance command. Afterward, at 1320, the UE 110 applies the timing advance command to synchronize the uplink. Alternately or additionally, the UE 110 starts a time alignment timer at 1320.

To establish an RRC connection, the UE 110 transmits an RRC request message (e.g., RRCSetupRequest, RRCResumeRequest, RRCResumeRequest1, or RRCReestablishmentRequest) to the gNB-DU 122 at 1325. For example, the UE 110 generates and transmits an RRC request message (RRCResumeRequest or RRCResumeRequest1), an RRC connection setup request message (RRCSetupRequest), or an RRC connection reestablishment request message (RRCReestablishmentRequest) to the gNB-DU 122. In response to receiving the RRC request message, at 1330, the gNB-DU 122 generates a cell-group-configuration IE without the reconfiguration-with-sync IE. At 1335, the gNB-DU 122 transmits the cell-group-configuration IE in an initial UL RRC message transfer message to the gNB-CU 121. In implementations, the initial UL RRC message transfer message includes a UE-identifier (e.g., gNB-DU UE F1AP ID) allocated by the gNB-DU 122.

At 1340, and in response to receiving the UL RRC message transfer, the gNB-CU 121 encodes and transmits, using F1AP, a DL RRC message transfer to the gNB-DU 122. In turn, the gNB-DU 122 transmits an RRC setup message to the UE 110 at 1345. The UE 110 replies by transmitting an RRC setup complete message (RRCSetupComplete) at 1350. The gNB-DU 122 then communicates the RRC setup complete message to the gNB-CU 121, using an F1AP UL RRC message transfer, at 1355. Accordingly, the transactions as described in diagram 1300 prevent the UE 110 from triggering a reset to a corresponding MAC entity, thus avoiding a synchronization failure in the uplink.

In implementations, if the gNB-CU 121 receives an RRC resume request message and decides to resume the UE 110, the gNB-CU 121 initiates a UE context setup procedure to the gNB-DU 122 and the procedures described in FIG. 11 or FIG. 12 can be applied to the gNB-CU 121 and the gNB-DU 122. For instance, the gNB-DU 122 generates a cell-group-configuration IE (e.g., CellGroupConfig) without the reconfiguration-with-sync IE and sends the cell-group-configuration IE in a UE context setup response message to the gNB-CU 121.

Example Procedures

FIGS. 14, 15, 16, 17, 18, 19, and 20 depict example methods 1400, 1500, 1600, 1700, 1800, 1900, and 2000 respectively, for handing an RRC cell group configuration. Methods 1400, 1500, 1600, 1700, and 1800 illustrate sets of operations (or acts) performed in, but not necessarily limited to, the order or combinations in which the operations are shown herein. Further, any of one or more of the operations may be repeated, combined, reorganized, skipped, or linked to provide a wide array of additional and/or alternate methods.

Figure 14:
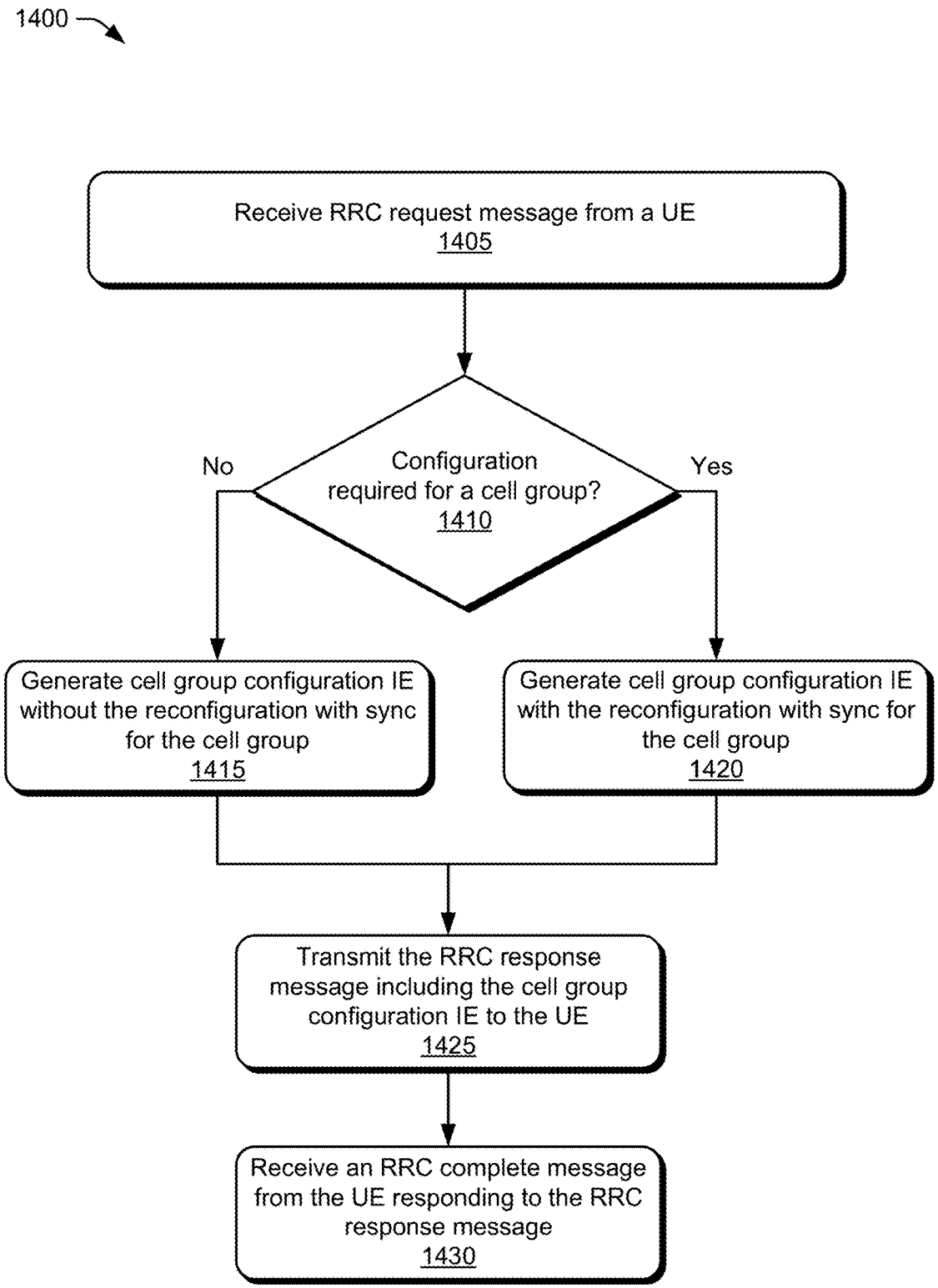
FIG. 14 depicts a method for handling an RRC cell group configuration by a base station.
Figure 15:
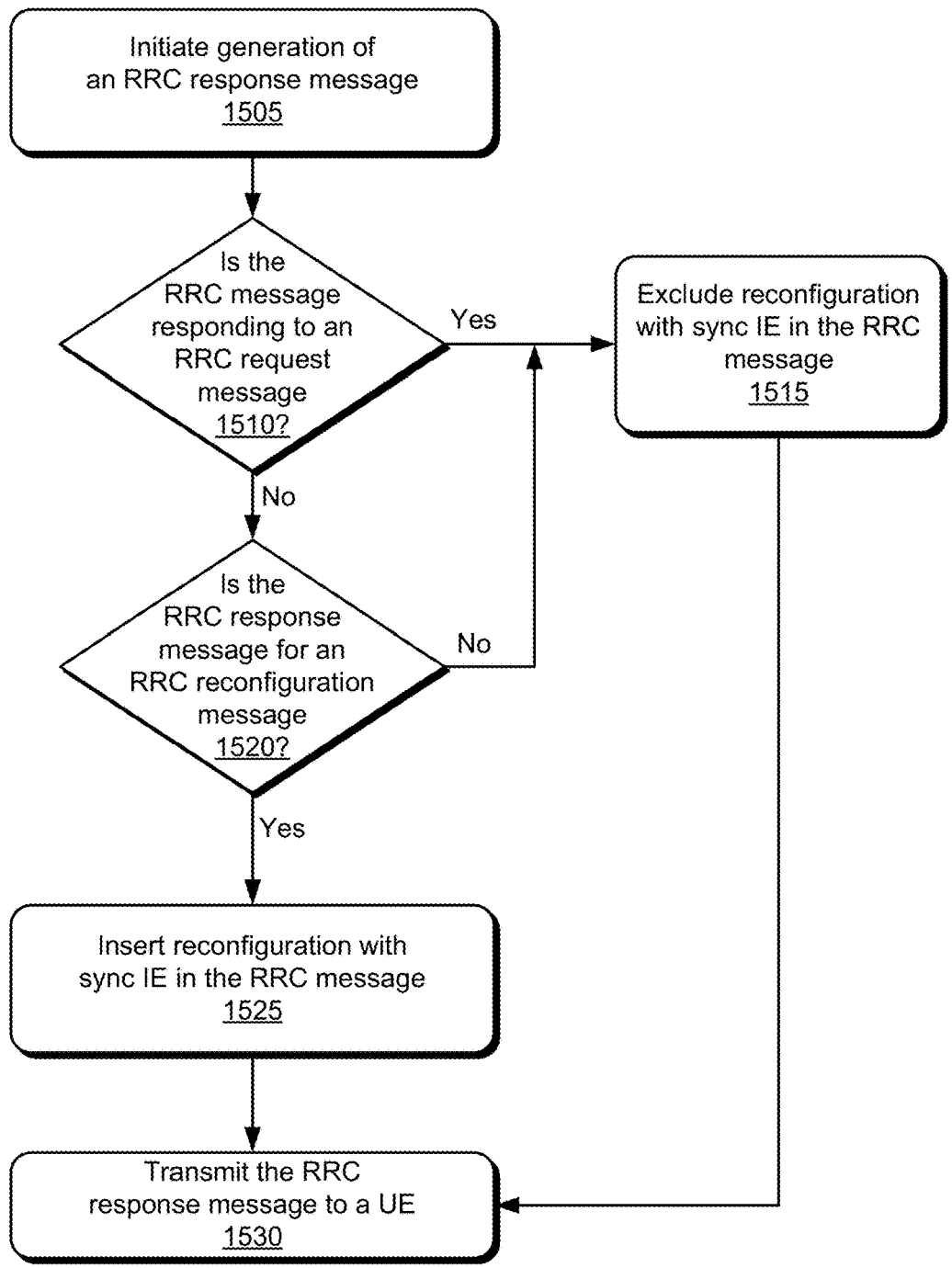
FIG. 15 depicts an example method for handling an RRC cell group configuration by a base station.
Figure 16:
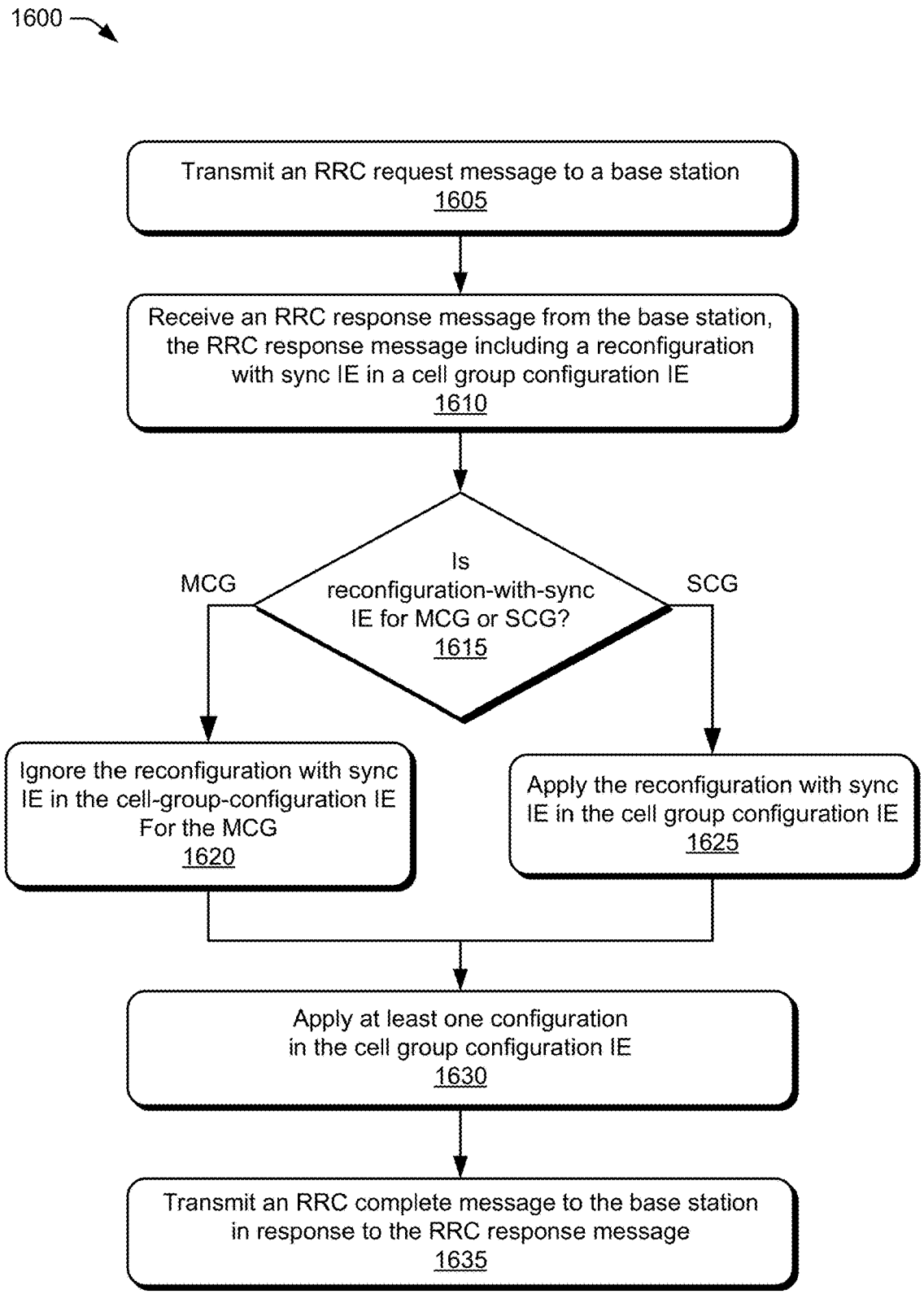
FIG. 16 depicts an example method for handling an RRC cell group configuration by a UE.
Figure 17:
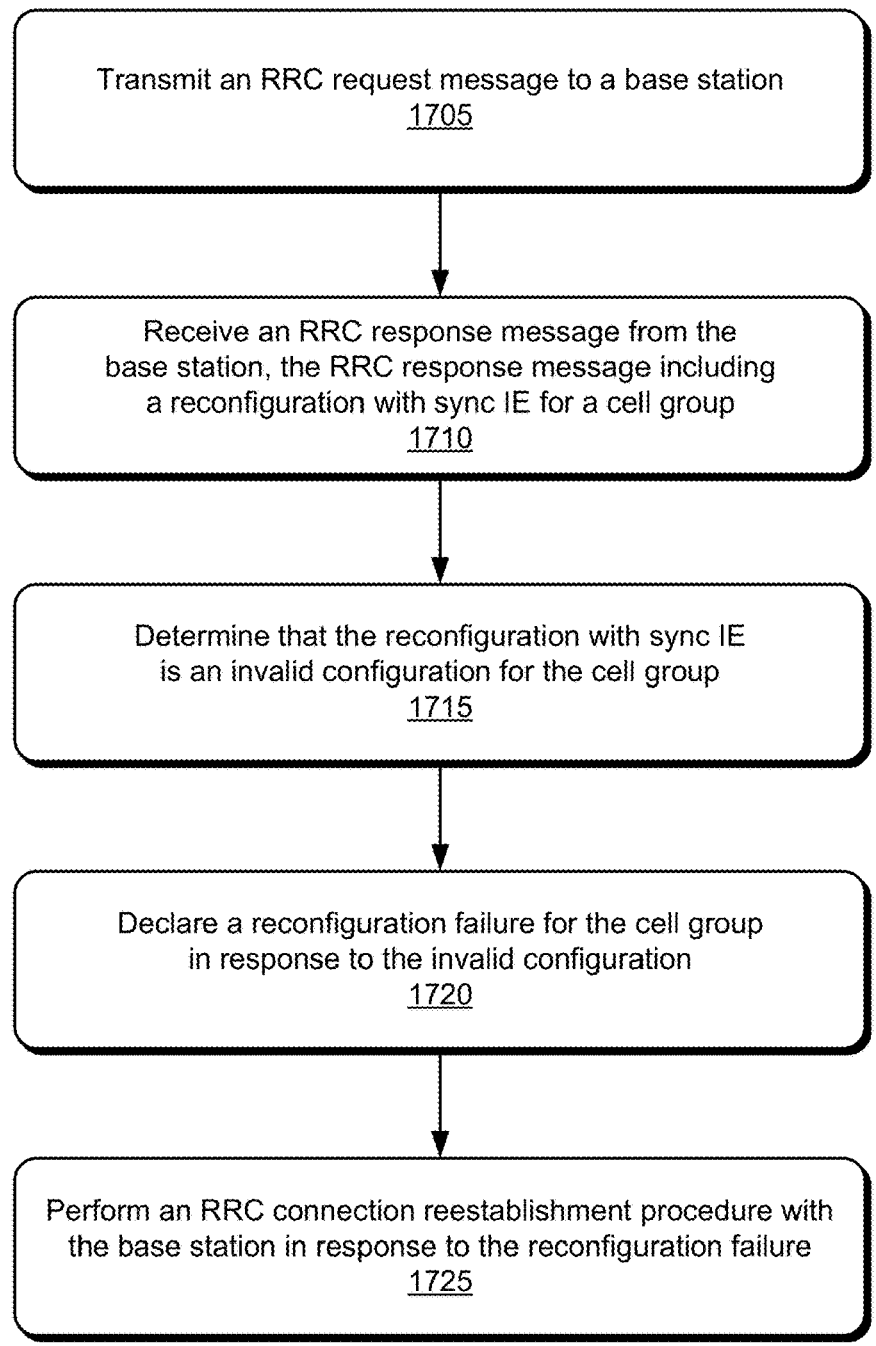
FIG. 17 depicts an example method for handling an RRC cell group configuration by a UE.
Figure 18:
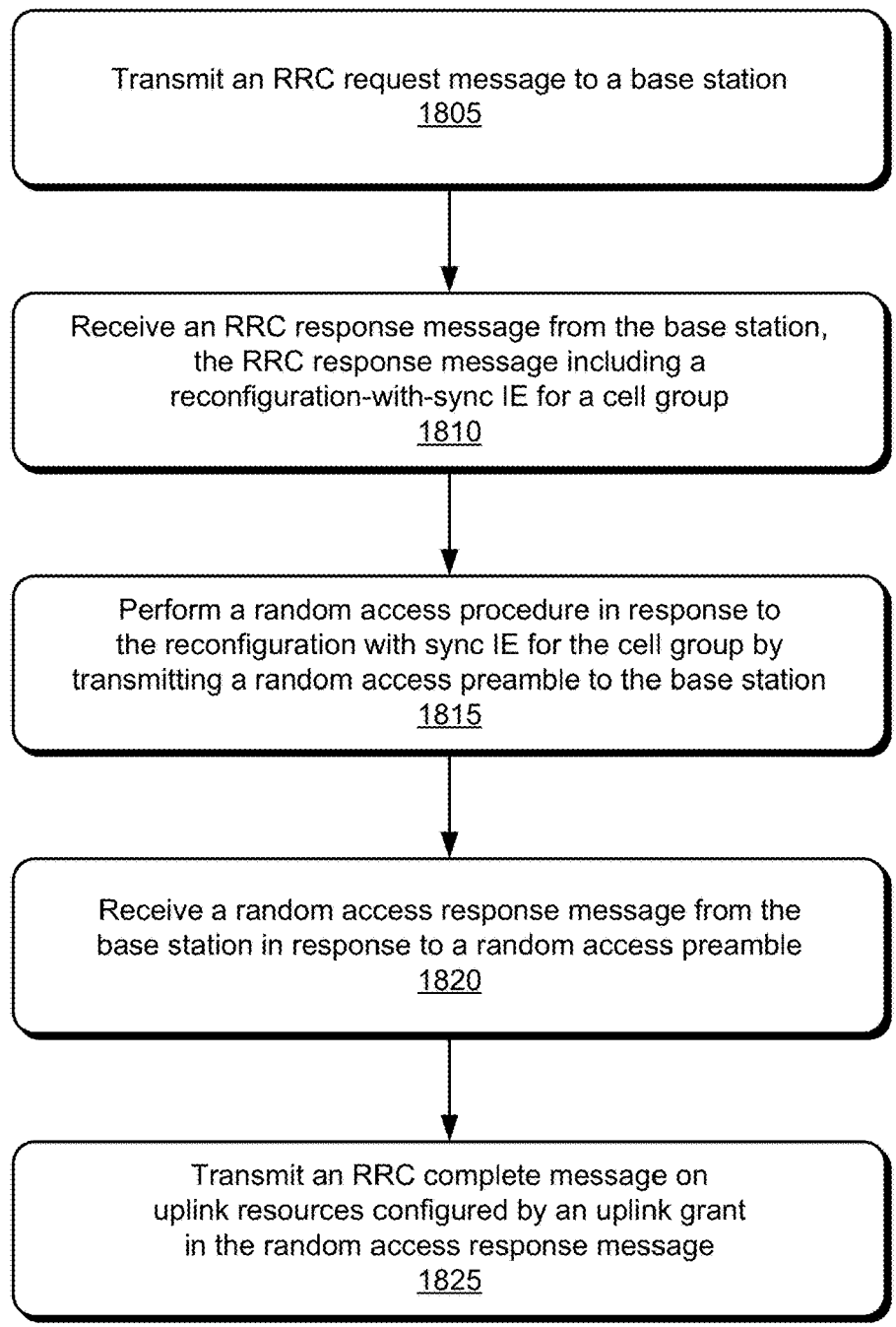
FIG. 18 depicts an example method for handling an RRC cell group configuration by a UE.
Figure 19:
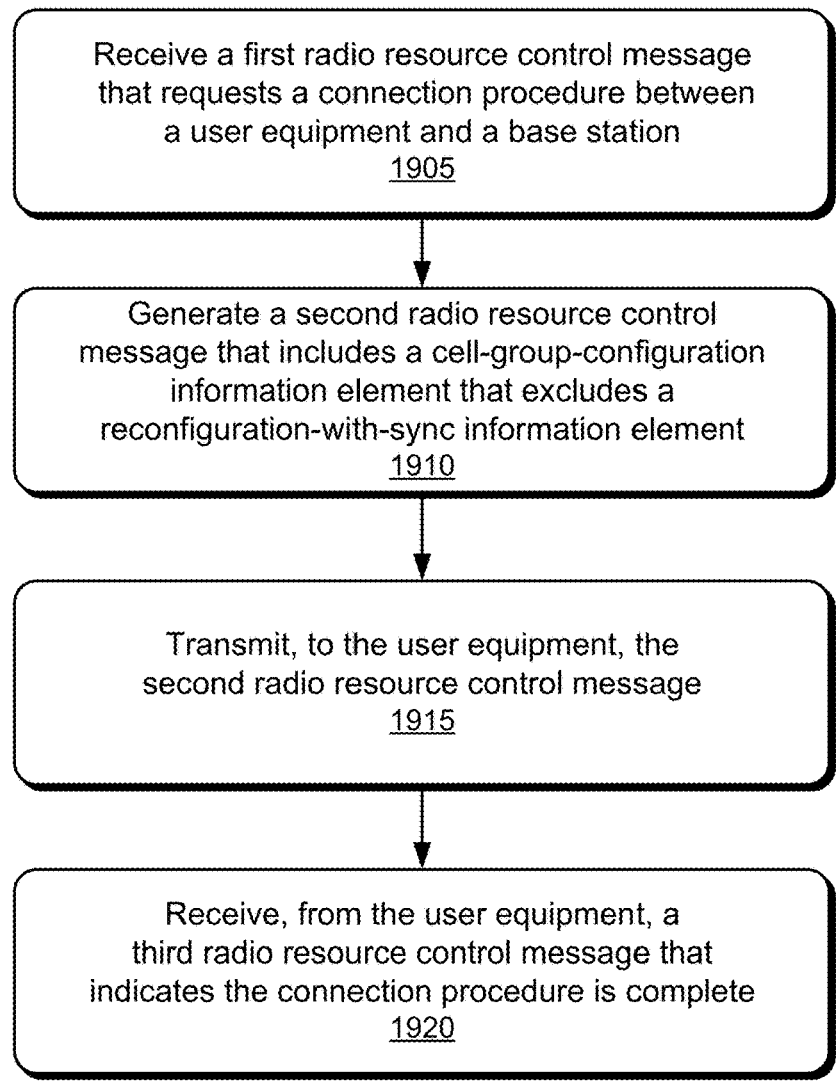
FIG. 19 depicts an example method for handling an RRC cell group configuration by a UE.

FIGS. 14-16 illustrate different procedures performed by a base station to handle an RRC cell group configuration. In FIG. 14, the base station determines whether to exclude a reconfiguration-with-sync IE in a cell-group-configuration IE based on whether a configuration is required for the cell group. In FIG. 15, the base station determines whether to exclude the reconfiguration-with-sync IE in the cell-group-configuration IE based on a type of RRC message received from the UE. In FIG. 16, the base station makes this determination based on whether the reconfiguration-with-sync IE is for a master cell group or a secondary cell group. FIGS. 17 and 18 illustrate procedures performed by the UE to handle the RRC cell group configuration. FIG. 18 illustrates an alternative manner in which the UE 110 handles the reconfiguration-with-sync IE in comparison to the method 1700 of FIG. 17. FIG. 19 illustrates an example in which a base station determines to exclude the reconfiguration-with-sync IE in the cell-group-configuration IE based on receiving a connection procedure request from a UE. FIG. 20 illustrates an example in which a UE requests a connection procedure request from a base station.

In portions of the following discussion, reference may be made to example wireless network environment 100 of FIG. 1, example device diagram 200 of FIG. 2, and entities detailed in FIG. 1, reference to which is made for example only. The techniques described in this specification are not limited to performance by one entity or multiple entities operating on one device. In the methods depicted in FIGS. 14-16, the base station may be a Next Generation Base NodeB (gNB) base station configured as either a distributed base station or a non-distributed base station.

Example method 1400 depicts a method for handling an RRC cell group configuration by a base station, such as base station 120 in FIG. 1.

At 1405, the base station receives an RRC request message from a UE. In an example, the base station (e.g., base station 120) receives, as the RRC request message, an RRC resume request from a UE (e.g., UE 110) as described at 325 of FIG. 3. Alternately or additionally, the base station (e.g., base station 120) receives an RRC request message, as described at 425 of FIG. 4, from the UE 110. The base station, for instance, receives an RRC resume request (as the RRC request message) when the UE is in an RRC_inactive state. As another example, the base station receives an RRC setup request as the RRC request message when the UE 110 is in an RRC_idle state. As yet another example, the base station receives an RRC resume request as the RRC request message when the UE is in an RRC_inactive state. In some implementations, the base station receives an RRC reestablishment request as the RRC request message when the UE 110 is in an RRC_connected state.

At 1410, the base station determines whether a configuration is required for a cell group (e.g., master cell group or secondary cell group). If a configuration of the cell group is not required, then the base station determines to exclude a reconfiguration-with-sync information element (IE) for the cell group from an RRC response message that responds to the RRC request message. For instance, similar to that described at 330 of FIG. 3, the base station 120 determines to exclude the reconfiguration-with-sync IE from the cell-group-configuration IE, and/or determines to not generate the reconfiguration-with-sync IE, when the base station 120 generates the cell-group-configuration IE for a master cell group (MCG) included in the RRC response message. Alternately or additionally, in implementations, the base station 120 determines (not shown) to include the reconfiguration-with-sync IE in the cell-group-configuration IE when base station 120 generates the cell-group-configuration IE for a secondary cell group (SCG) included in the RRC response message. In another instance, the base station 120 determines (not shown) to include the reconfiguration-with-sync IE in the cell-group-configuration IE in an RRC message if the RRC message (e.g., RRCReconfiguration) is not the RRC response message. As yet another example, the base station 120 determines (not shown) to exclude the reconfiguration-with-sync IE in the cell-group-configuration IE in an RRC message if the RC message (e.g., RRCReconfiguration) is the RRC response message, such as that described at 330 of FIG. 3.

Table 1 below shows an example in which the base station may determine to include or exclude the reconfiguration-with-sync IE according to an RRC message and a cell group configuration intended for the MCG or the SCG.

TABLE 1

Base station determination of whether to include or exclude
a reconfiguration-with-sync IE in an RRC message

| RRC message | cell group configuration for the MCG (if included) | cell group configuration for the SCG (if included) |
|---|---|---|
| RRC response message responding to an RRC request message | The reconfiguration-with-sync IE is not included. | The reconfiguration-with-sync IE is included |
| RRC message (e.g., RRCReconfiguration) not responding to an RRC request message | The reconfiguration-with-sync IE may be included if the base station determines that reconfiguration with sync is needed (e.g, in a handover case or when refreshing security keys). The reconfiguration-with-sync IE may be excluded if the base station determines reconfiguration with sync is not needed (e.g., in cases: neither handover nor refreshing security keys). | The reconfiguration-with-sync IE may be included if the base station determines reconfiguration with sync is needed (e.g., for primary secondary cell change or refreshing security keys). The reconfiguration-with-sync IE may be excluded if the base station determines reconfiguration with sync is not needed (e.g., in cases: neither handover nor refreshing security keys). |

Conventional methods require the base station to include the reconfiguration-with-sync IE in the cell group configuration, which may result in a synchronization failure. As described above, the reconfiguration-with-sync IE, if included in the cell-group-configuration IE, would trigger the UE 110 to reset its MAC entity and subsequently determine a synchronization failure.

At 1415, if a configuration is not required for the cell group ("NO"), the base station 120 generates a cell-group-configuration IE without the reconfiguration-with-sync IE. Based on the determination at 1410, the base station 120 generates the cell group configuration for a cell group (e.g., master cell group or secondary cell group) but does not generate or include the reconfiguration-with-sync IE.

Alternatively, at 1420. if the base station 120 determines that the configuration is required for the cell group ("YES"), the base station 120 generates the cell-group-configuration IE with the reconfiguration-with-sync IE for the cell group. The inclusion of the reconfiguration-with-sync IE may be specific to the cell group, such as the master cell group or a secondary cell group, as described above in Table 1.

At 1425, the base station transmits an RRC response message including the cell-group-configuration IE to the UE. In one example, the base station 120 transmits to the UE 110 an RRC resume message 314 that includes the cell-group-configuration IE, and the cell-group-configuration IE does not include the reconfiguration-with-sync IE. In another example, the base station 120 transmits to the UE 110 an RRC setup message (e.g., at 435 of FIG. 4) that includes the cell-group-configuration IE, and the cell-group-configuration IE does not include the reconfiguration-with-sync IE.

At 1430, the base station receives an RRC complete message from the UE responding to the RRC response message. For example, the base station 120 may receive an RRC resume complete message from the UE 110 indicating that the RRC connection resume procedure is complete, or an RRC setup complete message from the UE 110 indicating that the RRC connection establishment procedure is complete, such as that described at 340 of FIG. 3 and/or at 440 of FIG. 4.

In one example, the base station 120 determines to include the reconfiguration-with-sync IE for a secondary cell group (SCG) in the RRC response message if the RRC response message is an RRC resume message. If the RRC response message is not the RRC resume message, the base station 120 determines to exclude the reconfiguration-with-sync IE for the SCG in the cell group configuration of the RRC response message. In implementations, the reconfiguration-with-sync IE for the secondary cell group directs the UE 110 to perform at least one action, some examples of which are described below.

For instance, in some implementations, the action(s) performed by the UE 110 in response to the reconfiguration-with-sync IE include, responsive to a timer running, stopping the timer (e.g., timer T310) for a special cell (SpCell) (e.g., primary cell (PCell) or primary secondary cell (SCell)) of the base station 120) configured in the reconfiguration-with-sync IE. Alternately or additionally, the action(s) include starting a timer (e.g., timer T304) for the SpCell with a timer value set to a value defined in the reconfiguration-with-sync IE. In some implementations, the action(s) include: based on the reconfiguration-with-sync IE including a frequency information downlink IE (frequencyInfoDL), considering the SpCell to be one of: a synchronization signal block (SSB) frequency indicated by the frequency information downlink IE with a physical cell identity indicated by a physical cell identifier IE, or the SSB frequency of the source SpCell with the physical cell identifier IE.

Alternately or additionally, the action(s) include one or more of: starting synchronizing to the DL of the SpCell and acquiring the management information base (MIB) of the SpCell, resetting the MAC entity of a cell group (e.g., the master cell group or the secondary cell group) for which the reconfiguration-with-sync IE is configured, considering the SCell(s) of a cell group for which the reconfiguration-with-sync IE is configured to be in a deactivated state, applying a value of a new UE-identity as a cell RNTI (C-RNTI) for a cell group for which the reconfiguration-with-sync IE is configured, configuring lower layers in accordance with an SpCell configuration IE (e.g., spCellConfigCommon) in the reconfiguration-with-sync IE or configuring lower layers in accordance with any additional fields included in the reconfiguration-with-sync IE, and performing a random access procedure on the SpCell in accordance with random access configuration(s) in the reconfiguration-with-sync IE or in the RRC reconfiguration message including the reconfiguration-with-sync IE.

In some implementations, the base station 120 applies at least one configuration in the cell-group-configuration IE for a master cell group to communicate with the UE 110 if the cell-group-configuration IE is configured for the master cell group. Another base station can apply at least one configuration in the cell-group-configuration IE for a secondary cell group to communicate with the UE 110 if the cell-group-configuration IE is configured for the secondary cell group.

FIG. 15 depicts an example method 1500 for handling an RRC cell group configuration by a base station. In method 1500, the base station may be a Next Generation Base NodeB (gNB) base station. While the base station 120 relies on whether a reconfiguration is required for the cell group in the method 1400 of FIG. 14, the base station relies on criteria associated with the RRC message in the method 1500 of FIG. 15 to determine whether to include or exclude the reconfiguration-with-sync IE in the RRC message to the UE 110.

At 1505, a base station initiates generation of an RRC response message. For example, the base station (e.g., base station 120) initiates the generation of an RRC response message that responds to an RRC message received from a UE (e.g., UE 110), such as that described at 325 of FIG. 3 or at 425 of FIG. 4.

At 1510, the base station determines whether the RRC response message is responding to an RRC request message, such as the base station 120 determining whether the RRC response message corresponds to an RRC request message from a UE (e.g., UE 110). In response to determining that the RRC response message corresponds to a response to an RRC request message (e.g., RRC setup request, RRC resume request, RRC reestablishment request), then at 1515 (e.g., "YES"), the base station 120 determines to exclude the reconfiguration-with-sync IE from cell-group-configuration IE in the RRC response message. Some implementations direct the cell-group-configuration IE to a master cell group or a secondary cell group.

In response to determining that the RRC response message does not correspond to a response to an RRC request message, then at 1520 (e.g., "NO"), the base station 120 determines whether the RRC message received from the UE (e.g., UE 110) corresponds to an RRC reconfiguration message (e.g., RRCReconfiguration). In response to determining that the RRC message received from the UE does not correspond to an RRC reconfiguration message ("NO"), then the method proceeds to 1515. In other words, the base station 120 determines to exclude the reconfiguration-with-sync IE from the RRC response message, such as by excluding the reconfiguration-with-sync IE in the cell-group-configuration IE directed to the master cell group or the secondary cell group.

Conversely, in response to determining that the RRC message from the UE corresponds to an RRC reconfiguration message, at 1525 (e.g., "YES"), the base station 120 generates the reconfiguration-with-sync IE and inserts the reconfiguration-with-sync IE into the RRC response message. In implementations, the base station 120 configures reconfiguration-with-sync IE for RRC reconfiguration, and not necessarily for RRC connection establishment.

At 1530, the base station transmits the RRC response message to the UE. For instance, the base station (e.g., base station 120) transmits the RRC response message to the UE (e.g., UE 110) associated with the received RRC message. In some implementations, the transmitted RRC response message includes the reconfiguration-with-sync IE, such as in implementations where the received RRC message (from the UE) corresponds to an RRC reconfiguration message. Alternately or additionally, the RRC response message excludes the reconfiguration-with-sync IE if the received RRC message (from the UE) is not an RRC reconfiguration message, or if the RRC response message is responding to an RRC request message. In either case, the base station 120 applies at least one configuration in the cell-group-configuration IE to communicate with the UE 110.

FIG. 16 depicts an example method 1600 for handling an RRC cell group configuration by a UE. In some aspects of the method 1600, the UE communicates with a base station, such as a Next Generation Base NodeB (gNB) base station. While the base station 120 relies on criteria associated with the RRC message in the method 1500 of FIG. 15 to determine whether to include or exclude the reconfiguration-with-sync IE in the RRC message to the UE 110, the base station 120 in the method 1600 of FIG. 16 relies on whether the reconfiguration-with-sync IE is for a master cell group or a secondary cell group.

At 1605, a UE transmits an RRC request message to a base station. For example, the UE (e.g., UE 110) transmits an RRC request message to the base station (e.g., base station 120), such as an RRC setup request message, an RRC resume request message, or an RRC reestablishment request message as described at 525 of FIG. 5 and/or at 625 of FIG. 6.

At 1610, the UE receives an RRC response message from the base station, where the RRC response message includes a reconfiguration-with-sync IE in a cell-group-configuration IE. In some cases, the UE 110 receives an RRC resume message as the RRC response message, such as that transmitted by the base station 120 at 530 of FIG. 5. As another example, the UE 110 receives an RRC setup message as the RRC response message, such as that described at 630 of FIG. 6, where the RRC response message includes a cell-group-configuration IE with the reconfiguration-with-sync IE. In implementations, the cell-group-configuration IE is directed to a master cell group or for a secondary cell group.

At 1615, the UE determines whether the reconfiguration-with-sync IE corresponds to a master cell group (MCG) or a secondary cell group (SCG).

In response to determining that the reconfiguration-with-sync IE corresponds to an MCG, at 1620, the UE ignores the reconfiguration-with-sync. For instance, the UE (e.g., UE 110) ignores the reconfiguration-with-sync IE included in the RRC response message, rather than performing an action based on the reconfiguration-with-sync IE (e.g., an action that may result in a synchronization failure of the uplink). To illustrate, the UE 110 ignores the reconfiguration-with-sync IE, such as that described at 535 of FIG. 5 and/or at 635 of FIG. 6.

Alternatively, at 1625, the UE 110 applies the reconfiguration-with-sync IE if the cell-group-configuration IE is for the secondary cell group. In this case, the UE 110 performs a random access procedure on a primary secondary cell according to the reconfiguration-with-sync IE.

At 1630, the UE applies at least one configuration in the cell group configuration. In one or more examples, the UE (e.g., UE 110) applies one or more configurations other than the reconfiguration-with-sync IE in the cell-group-configuration IE. This allows the UE 110 to perform at least one action for the master cell group or the secondary cell group, other than an action associated with the reconfiguration-with-sync IE.

At 1635, the UE transmits an RRC complete message to the base station in response to the RRC response message. For example, the UE (e.g., UE 110) transmits the RRC resume complete message as described at 540 of FIG. 5, or the RRC setup complete message as described at 640 of FIG. 6, to the base station (e.g., base station 120) to indicate completion of the RRC connection resume procedure or the RRC connection establishment procedure.

FIG. 17 depicts an example method 1700 for handling an RRC cell group configuration by a UE. In some aspects of the method 1700, the UE communicates with a base station, such as a Next Generation Base NodeB (gNB) base station. While the methods 1400, 1500, and 1600 involve processes performed by the base station 120, the method 1700 is implemented by the UE 110.

At 1705, the UE transmits an RRC request message (e.g., 710, 810) to the base station 120. For example, the UE (e.g., UE 110) transmits an RRCResumeRequest, an RRCResumeRequest1, an RRCSetupRequest, or an RRCReestablishmentRequest as described at 725 of FIG. 7 or at 825 of FIG. 8. At 1710, the UE receives an RRC response message from the base station. For instance, the UE (e.g., UE 110) receives an RRC response message from the base station (e.g., base station 120) via the wireless link 130, such as that described at 730 of FIG. 7 or at 830 of FIG. 8. In implementations, the RRC response message includes a cell-group-configuration IE including the reconfiguration-with-sync IE for a cell group, such as a master cell group (MCG) or a secondary cell group (SCG).

At 1715, the UE determines that the reconfiguration-with-sync IE is an invalid configuration for the cell group, such as that described at 735 of FIG. 7 and/or at 835 of FIG. 8. In implementations, the UE (e.g., UE 110) determines the reconfiguration-with-sync IE is invalid based on the RRC request message transmitted at 1705 (e.g., a reconfiguration is an invalid response to an RRC request message that requests to resume or establish an RRC connection). Alternately or additionally, the UE (e.g., UE 110) determines the reconfiguration-with-sync-IE is an invalid configuration based on the RRC response message received at 1710. In some implementations, the UE 110 determines the reconfiguration-with-sync-IE is an invalid configuration based on identifying that the cell-group-configuration IE is for the MCG. In other implementations (not illustrated), the UE 110 determines that the reconfiguration-with-sync IE is a valid configuration for the cell group based on identifying the cell-group-configuration IE is for the SCG. If the UE 110 receives the reconfiguration-with-sync IE in an RRC message which is not the RRC response message, such as an RRC reconfiguration message, the UE 110 determines that the reconfiguration-with-sync IE is a valid configuration.

At 1720, in response to determining the reconfiguration-with-sync-IE is an invalid configuration, the UE (e.g., UE 110) declares a reconfiguration failure for the cell group. In implementations, at 1725, the UE (e.g., UE 110) performs an RRC connection reestablishment procedure with the base station (e.g., base station 120) in response to the reconfiguration failure. This prevents the UE 110 from performing an action in response to the reconfiguration-with-sync that would result in a synchronization failure of the uplink. Examples of RRC connection reestablishment procedures are described with respect to that described at 740 through 765 of FIG. 7 and/or 840 through 865 of FIG. 8.

As above, the UE 110 may apply at least one configuration in the cell group configuration for the cell group other than a configuration associated with the reconfiguration-with-sync IE. Alternatively, the UE 110 does not apply the cell group configuration.

FIG. 18 depicts an example method 1800 for handling an RRC cell group configuration by a UE. In method 1800, the UE communicates with a base station, such as a Next Generation Base NodeB (gNB) base station. The method 1800 includes alternative functionality performed by the UE 110 for handling an RRC cell group configuration, in comparison to the method 1700. For instance, while the method 1700 involves the UE 110 determining an invalid reconfiguration, the method 1800 involves the UE 110 initiating a random access procedure.

At 1805, the UE transmits an RRC request message to a base station, such as that described at 925 of FIG. 9 and/or at 1025 of FIG. 10. For example, the UE (e.g., UE 110) transmits an RRC request message to the base station (e.g., base station 120), where the RRC request message corresponds to an RRCResumeRequest, an RRCResumeRequest1, RRCSetupRequest, or RRCReestablishmentRequest.

At 1810, the UE receives an RRC response message from the base station, where the RRC response message includes a cell-group-configuration IE including the reconfiguration-with-sync IE for a cell group, such as a master cell group (MCG) or a secondary cell group (SCG). For example, similar to that described at 930 of FIG. 9 and/or at 1030 of FIG. 10, the UE (e.g., UE 110) receives the RRC response message from the base station (e.g., base station 120) using the wireless link 130 of FIG. 1.

At 1815, the UE performs a random access procedure in response to the reconfiguration-with-sync IE for the cell group by transmitting a random access preamble to the base station. For instance, the UE (e.g., UE 110), initiates a random access procedure, similar to that described at 935 of FIG. 9 or 1035 of FIG. 10, and transmits the random access preamble to the base station (e.g., base station 120), similar to that described at 940 of FIG. 9 and/or at 1040 of FIG. 10.

At 1820, the UE receives a random access response message from the base station in response to the random access preamble. For example, the UE (e.g., UE 110) receives a random access response from the base station (e.g., base station 120) similar to that described at 945 of FIG. 9, or the random access response as described at 1045 of FIG. 10.

At 1825, the UE transmits an RRC complete message on uplink resources configured by an uplink grant in the random access response message if the cell-group-configuration IE is for the MCG, and on uplink resources configured by an uplink grant in a downlink control information received on a physical downlink control channel (PDCCH). For example, the UE (e.g., UE 110) transmits an RRC resume complete message, such as that described at 955 of FIG. 9, or an RRC setup complete message similar to that described at 1055 of FIG. 10, to the base station (e.g., base station 120) to indicate that an RRC connection resume procedure or an RRC connection establishment procedure, respectively, is complete.

FIG. 19 depicts an example method 1900 for handling an RRC cell group configuration by a base station. In some aspects of the method 1900, the base station may be a Next Generation Base NodeB (gNB) base station.

At 1905, a base station receives a first radio resource control message that requests a connection procedure between a user equipment and a base station. For instance, the base station (e.g., base station 120) receives an RRCResumeRequest message or an RRCResumeRequest1 message from a UE (e.g., UE 110), similar to that described at 325 of FIG. 3, to request a connection resume procedure. As another example, the base station (e.g., base station 120) receives, from the UE (e.g., UE 110) an RRCSetupRequest message to request a connection establishment procedure, an RRCResumeRequest message to request connection resume procedure, or an RRCReestablishmentRequest message to request a connection reestablishment procedure similar to that described at 425 of FIG. 4. In some implementations, the base station operates as part of a disaggregated base station architecture in which different components of the disaggregated base station determine whether to exclude the reconfiguration-with-sync IE in an RRC message to the UE. For example, similar to that described at 1325 of FIG. 13, a base station operating in the disaggregated base station architecture (e.g., base station 122) receives the first radio resource control message from the UE (e.g., UE 110), such as an RRCResumeRequest message or an RRCResumeRequest1 to request a connection resume procedure, an RRCSetupRequest message to request a connection establishment procedure, an RRCResumeRequest message to request connection resume procedure, or an RRCReestablishmentRequest to request a connection reestablishment procedure.

At 1910, the base station generates a second radio resource control message that includes a cell-group-configuration information element that excludes a reconfiguration-with-sync information element. For instance, similar to that described at 330 of FIG. 3 and/or at 430 or FIG. 4, the base station (e.g., base station 120) generates an RRC Resume message, where the generating is based on a determination to exclude a reconfiguration-with-sync IE from a cell-group-configuration IE included in the RRC Resume message. As another example, a base station operating in the disaggregated base station architecture (e.g., base station 122) generates an RRC setup message similar to that described at 1345 of FIG. 13, where the RRC setup message includes a cell-group-configuration IE that excludes a reconfiguration-with-sync IE generated at 1330 of FIG. 13.

At 1915, the base station transmits, to the user equipment, the second radio resource control message. For example, similar to that described at 335 of FIG. 3 or 435 of FIG. 4, the base station (e.g., base station 120) transmits an RRC resume message and/or an RRC Setup message to the UE (e.g., UE 110). As another example, as described at 1345 of FIG. 13, the base station (e.g., base station 122) transmits an RRC Setup message to the UE (e.g., UE 110) after communicating with another base station included in the disaggregated base station architecture (e.g., base station 121). For instance, the base station 122 communicates the cell-group-configuration IE that excludes a reconfiguration-with-sync IE to the base station 121 using an UL RRC message transfer. The base station 122 then receives a DL RRC message transfer response from the base station 121 and transmits the RRC Setup message to the UE as described at 1335, at 1340, and at 1345 of FIG. 13.

At 1920, the base station receives, from the user equipment, a third radio resource control message that indicates the connection procedure is complete. For example, the base station (e.g., base station 120) receives an RRCResumeComplete message from the UE (e.g., UE 110) as described at 340 of FIG. 3. As another example, the base station 120 receives an RRCSetupComplete message from the UE 110 as described at 440 of FIG. 4. As yet another example, a base station operating in a disaggregated base station architecture (e.g., base station 122) receives an RRCSetupComplete message from the UE 110 as described at 1350 of FIG. 13.

FIG. 20 depicts an example method 2000 for handling an RRC cell group configuration by a UE. In method 2000, the UE communicates with a base station, such as a Next Generation Base NodeB (gNB) base station.

At 2005, a UE transmit a first radio resource control message to a base station to request a connection procedure between a user equipment and the base station. For instance, similar to that described at 325 of FIG. 3, the UE (e.g., UE 110) transmits an RRCResumeRequest message or an RRCResumeRequest1 message to the base station (e.g., base station 120) to request a connection resume procedure. As another example, similar to that described at 425 of FIG. 4, the UE (e.g., UE 110) transmits an RRCSetupRequest message to request a connection establishment procedure, an RRCResumeRequest message to request connection resume procedure, or an RRCReestablishmentRequest message to request a connection reestablishment procedure. With reference to that described at 1325 of FIG. 13, in some implementations, the UE 110 communicates the first radio resource control message to a base station operating in a disaggregated base station architecture (e.g., base station 122).

At 2010, the UE receives a second radio resource control message from the base station, where the second radio resource control message includes a cell-group-configuration IE that excludes a reconfiguration-with-sync IE. As one example, with reference to that described at 335 of FIG. 3 or 435 of FIG. 4, the UE (e.g., UE 110) receives an RRC resume message and/or an RRC Setup message from the base station (e.g., base station 120). As another example, the UE (e.g., UE 110) receives an RRC Setup message from a base station operating in a disaggregated base station architecture (e.g., base station 122), such as that described at 1345 of FIG. 13.

At 2015, the UE performs the connection procedure with the base station based, at least in part, on the second radio resource control message by transmitting, to the base station, a third radio resource control message that indicates the connection procedure is complete. In implementations, the UE (e.g., UE 110) transmits an RRCResumeComplete message as described at 340 of FIG. 3, or an RRCSetupComplete message as described at 440 of FIG. 4. As yet another example, the UE (e.g., UE 110) transmits an RRCSetupComplete message to a base station operating in a disaggregated base station architecture (e.g., base station 122), such as that described at 1350 of FIG. 13.

The order in which the method blocks of FIGS. 14, 15, 16, 17, 18, 19, and 20 are described are not intended to be construed as a limitation, and any number of the described method blocks can be combined in any order to implement a method or an alternate method.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for handling a radio resource control cell group configuration have been described in language specific to features and/or methods, it is to be understood that the subject of the appended claims is not necessarily limited to the specific features or methods described. Rather, the specific features and methods are disclosed as example implementations of handling a radio resource control cell group configuration.

In the following, several examples are described.

Example 1

A method for handling a radio resource control cell group configuration by a base station, the method comprising the base station: receiving, by the base station and from a user equipment, a first radio resource control message that requests a connection procedure between the user equipment and the base station; generating a second radio resource control message that includes a cell-group-configuration information element that excludes a reconfiguration-with-sync information element; transmitting, to the user equipment, the second radio resource control message; and receiving, from the user equipment, a third radio resource control message that indicates the connection procedure is complete.

Example 2

The method of example 1, wherein: the first radio resource control message comprises a radio resource control resume request message, the second radio resource control message comprises a radio resource control resume message, the third radio resource control message comprises a radio resource control resume complete message, and the connection procedure comprises a connection resume procedure.

Example 3

The method of example 1, wherein: the first radio resource control message comprises a radio resource control setup request message, the second radio resource control message comprises a radio resource control setup message, the third radio resource control message comprises a radio resource control setup complete message, and the connection procedure comprises a connection establishment procedure.

Example 4

The method as recited in any one of the examples 1 to 3, wherein the generating the second radio resource control message further comprises the base station determining, in response to receiving the first radio resource control message, to exclude the reconfiguration-with-sync information element from the cell-group-configuration information element.

Example 5

The method as recited in example 1, wherein the base station includes a base station distributed unit that communicates with a base station central unit, and the generating the second radio resource control message comprises: transmitting, to the base station central unit, the cell-group-configuration information element that excludes the reconfiguration-with-sync information element using an initial uplink radio resource control transfer message; receiving, from the base station central unit, a downlink radio resource control transfer message; and generating, based on the receiving, the second radio resource control message as a radio resource control setup message, wherein the radio resource control setup message is configured with the cell-group-configuration information element that excludes the reconfiguration-with-sync information element.

Example 6

The method as recited in example 5, wherein the first radio resource control message comprises a radio resource control resume request.

Example 7

The method as recited in example 5, wherein the first radio resource control message comprises a radio resource control setup request.

Example 8

The method as recited in any one of examples 5 to 7, wherein the third radio resource control message comprises a radio resource control setup complete message, the initial uplink radio resource control transfer message comprises a first uplink radio resource control transfer message, and the method further comprises: communicating the radio resource control setup complete message to the base station central unit using a second uplink radio resource control transfer message.

Example 9

A base station device comprising: a wireless transceiver; and a processor and memory system coupled to the wireless transceiver and configured to direct the base station device to perform any one of the methods 1 to 8.

Example 10

A method of handling radio resource control cell group configurations by a user equipment, the method comprising: transmitting, by the user equipment, a first radio resource control message to a base station to request a connection procedure between the user equipment and the base station; receiving a second radio resource control message from the base station, the second radio resource control message including a cell-group-configuration information element that excludes a reconfiguration-with-sync information element; and performing the connection procedure with the base station based, at least in part, on the second radio resource control message, by transmitting, to the base station, a third radio resource control message that indicates the connection procedure is complete.

Example 11

The method as recited in example 10, wherein: the first radio resource control message comprises a radio resource control resume request message, the second radio resource control message comprises a radio resource control resume message, the third radio resource control message comprises a radio resource control resume complete message, and the connection procedure comprises a connection resume procedure.

Example 12

The method as recited in example 10, wherein: the first radio resource control message comprises a radio resource control setup request message, the second radio resource control message comprises a radio resource control setup message, the third radio resource control message comprises a radio resource control setup complete message, and the connection procedure comprises a connection establishment procedure.

Example 13

The method as recited in any one of examples 10 to 12, wherein the performing the connection procedure with the base station based, at least in part, on the second radio resource control message further comprises: determining, in response to receiving the second radio resource control message, that a time alignment timer associated with the connection procedure is non-expired; determining, based on the determining that the time alignment time is non-expired, that an uplink connection with the base station is synchronized; and determining to transmit the third radio resource control message based on the determination that the uplink connection is synchronized.

Example 14

The method as recited in any one of examples 10 to 13 further comprising: maintaining, in response to receiving the second radio resource control message, a state of a medium access control entity.

Example 15

A user equipment comprising: a wireless transceiver; and a processor and memory system coupled to the wireless transceiver and configured to direct the user equipment to perform any one of the methods 10 to 14.

What is claimed is:

1. A method for handling a radio resource control cell group configuration by a base station, the method comprising the base station:
receiving, by the base station and from a user equipment, a first radio resource control message that requests a connection procedure between the user equipment and the base station;
generating a second radio resource control message that includes a cell-group-configuration information element that excludes a reconfiguration-with-sync information element;
transmitting, to the user equipment, the second radio resource control message; and
receiving, from the user equipment, a third radio resource control message that indicates the connection procedure is complete.

2. The method of claim 1, wherein:
the first radio resource control message comprises a radio resource control resume request message,
the second radio resource control message comprises a radio resource control resume message,
the third radio resource control message comprises a radio resource control resume complete message, and
the connection procedure comprises a connection resume procedure.

3. The method of claim 1, wherein:
the first radio resource control message comprises a radio resource control setup request message,
the second radio resource control message comprises a radio resource control setup message,
the third radio resource control message comprises a radio resource control setup complete message, and
the connection procedure comprises a connection establishment procedure.

4. The method as recited in claim 1, wherein the generating the second radio resource control message further comprises the base station determining, in response to receiving the first radio resource control message, to exclude the reconfiguration-with-sync information element from the cell-group-configuration information element.

5. The method as recited in claim 1, wherein the base station includes a base station distributed unit that communicates with a base station central unit, and the generating the second radio resource control message comprises:
transmitting, to the base station central unit, the cell-group-configuration information element that excludes the reconfiguration-with-sync information element using an initial uplink radio resource control transfer message;
receiving, from the base station central unit, a downlink radio resource control transfer message; and
generating, based on the receiving, the second radio resource control message as a radio resource control setup message, wherein the radio resource control setup message is configured with the cell-group-configuration information element that excludes the reconfiguration-with-sync information element.

6. The method as recited in claim 5, wherein the first radio resource control message comprises a radio resource control resume request.

7. The method as recited in claim 5, wherein the first radio resource control message comprises a radio resource control setup request.

8. A base station device comprising:
a wireless transceiver; and
a processor and memory system coupled to the wireless transceiver and configured to direct the base station device to perform operations comprising:
receiving, by the base station device and from a user equipment, a first radio resource control message that requests a connection procedure between the user equipment and the base station device;
generating a second radio resource control message that includes a cell-group-configuration information element that excludes a reconfiguration-with-sync information element;
transmitting, to the user equipment, the second radio resource control message; and
receiving, from the user equipment, a third radio resource control message that indicates the connection procedure is complete.

9. A method of handling radio resource control cell group configurations by a user equipment, the method comprising:
transmitting, by the user equipment, a first radio resource control message to a base station to request a connection procedure between the user equipment and the base station;
receiving a second radio resource control message from the base station, the second radio resource control message including a cell-group-configuration information element that excludes a reconfiguration-with-sync information element; and
performing the connection procedure with the base station based, at least in part, on the second radio resource control message, by transmitting, to the base station, a third radio resource control message that indicates the connection procedure is complete.

10. The method as recited in claim 9, wherein:
the first radio resource control message comprises a radio resource control resume request message,
the second radio resource control message comprises a radio resource control resume message,
the third radio resource control message comprises a radio resource control resume complete message, and
the connection procedure comprises a connection resume procedure.

11. The method as recited in claim 9, wherein:
the first radio resource control message comprises a radio resource control setup request message,
the second radio resource control message comprises a radio resource control setup message,
the third radio resource control message comprises a radio resource control setup complete message, and
the connection procedure comprises a connection establishment procedure.

12. The method as recited in claim 9, wherein the performing the connection procedure with the base station based, at least in part, on the second radio resource control message further comprises:
determining, in response to receiving the second radio resource control message, that a time alignment timer associated with the connection procedure is non-expired;
determining, based on the determining that the time alignment time is non-expired, that an uplink connection with the base station is synchronized; and
determining to transmit the third radio resource control message based on the determination that the uplink connection is synchronized.

13. A user equipment comprising:
a wireless transceiver; and
a processor and memory system coupled to the wireless transceiver and configured to direct the user equipment to perform operations comprising:
transmitting, by the user equipment, a first radio resource control message to a base station to request a connection procedure between the user equipment and the base station;
receiving a second radio resource control message from the base station, the second radio resource control message including a cell-group-configuration information element that excludes a reconfiguration-with-sync information element; and
performing the connection procedure with the base station based, at least in part, on the second radio resource control message, by transmitting, to the base station, a third radio resource control message that indicates the connection procedure is complete.

14. The user equipment as recited in claim 13, wherein:
transmitting the first radio resource control message comprises:
transmitting a radio resource control resume request message,
wherein receiving the second radio resource control message comprises:
receiving a radio resource control resume message,
wherein transmitting the third radio resource control message comprises:
transmitting a radio resource control resume complete message, and
wherein performing the connection procedure comprises: performing a connection resume procedure.

15. The user equipment as recited in claim 13, wherein:
transmitting the first radio resource control message comprises:
transmitting a radio resource control setup request message,
wherein receiving the second radio resource control message comprises:
receiving a radio resource control setup message,
wherein transmitting the third radio resource control message comprises:
transmitting a radio resource control setup complete message, and
wherein performing the connection procedure comprises: performing a connection establishment procedure.

16. The user equipment as recited in claim 13, wherein performing the connection procedure with the base station based, at least in part, on the second radio resource control message further comprises:
determining, in response to receiving the second radio resource control message, that a time alignment timer associated with the connection procedure is non-expired;
determining, based on the determining that the time alignment time is non-expired, that an uplink connection with the base station is synchronized; and
determining to transmit the third radio resource control message based on the determination that the uplink connection is synchronized.

17. A non-transitory computer-readable medium storing processor-executable instructions that, responsive to execution by at least one processor of a base station, cause the base station to perform operations comprising:
receiving, by the base station and from a user equipment, a first radio resource control message that requests a connection procedure between the user equipment and the base station;
generating a second radio resource control message that includes a cell-group-configuration information element that excludes a reconfiguration-with-sync information element;
transmitting, to the user equipment, the second radio resource control message; and
receiving, from the user equipment, a third radio resource control message that indicates the connection procedure is complete.

18. The non-transitory computer-readable medium as recited in claim 17, wherein:
receiving the first radio resource control message comprises:
receiving a radio resource control resume request message,
wherein generating the second radio resource control message comprises:
generating a radio resource control resume message, and
wherein receiving the third radio resource control message comprises:
receiving a radio resource control resume complete message.

19. A non-transitory computer-readable medium storing processor-executable instructions that, responsive to execution by at least one processor of a user equipment, cause the user equipment to perform operations comprising:
transmitting, by the user equipment, a first radio resource control message to a base station to request a connection procedure between the user equipment and the base station;

receiving a second radio resource control message from the base station, the second radio resource control message including a cell-group-configuration information element that excludes a reconfiguration-with-sync information element; and performing the connection procedure with the base station based, at least in part, on the second radio resource control message, by transmitting, to the base station, a third radio resource control message that indicates the connection procedure is complete.

20. The non-transitory computer-readable medium as recited in claim 19, wherein transmitting the first radio resource control message comprises:

transmitting a radio resource control resume request message, wherein receiving the second radio resource control message comprises:

receiving a radio resource control resume message, wherein transmitting the third radio resource control message comprises:

transmitting a radio resource control resume complete message, and wherein performing the connection procedure comprises:

performing a connection resume procedure.

* * * * *